(12) United States Patent
Tokizawa

(10) Patent No.: US 8,624,459 B2
(45) Date of Patent: Jan. 7, 2014

(54) ROTOR OF ELECTRIC ROTATING MACHINE INCLUDING NON-MAGNETIC BODY

(75) Inventor: Takashi Tokizawa, Nagoya (JP)

(73) Assignee: Denso Corporation, Kariya (JP)

( * ) Notice: Subject to any disclaimer, the term of this patent is extended or adjusted under 35 U.S.C. 154(b) by 266 days.

(21) Appl. No.: 13/039,862

(22) Filed: Mar. 3, 2011

(65) Prior Publication Data

US 2011/0241471 A1      Oct. 6, 2011

(30) Foreign Application Priority Data

Mar. 30, 2010    (JP) ................. 2010-076652

(51) Int. Cl.
*H02K 21/12*    (2006.01)
*H02K 1/22*    (2006.01)

(52) U.S. Cl.
USPC ............ 310/156.66; 310/156.67; 310/156.69; 310/263

(58) Field of Classification Search
USPC ............. 310/156.66, 156.67, 156.69, 156.71, 310/156.73, 216.004, 263
See application file for complete search history.

(56) References Cited

U.S. PATENT DOCUMENTS

| | | | | |
|---|---|---|---|---|
| 3,694,661 | A * | 9/1972 | Minowa .................. | 290/1 R |
| 5,177,388 | A | 1/1993 | Hotta et al. | |
| 5,177,391 | A | 1/1993 | Kusase | |
| 6,700,296 | B1 * | 3/2004 | Oohashi et al. ........... | 310/263 |
| 2006/0220477 | A1 | 10/2006 | Okumoto et al. | |
| 2007/0013261 | A1 * | 1/2007 | Shichijo et al. ........... | 310/263 |
| 2008/0048516 | A1 | 2/2008 | Oowatari et al. | |

FOREIGN PATENT DOCUMENTS

| | | |
|---|---|---|
| AU | 710990 | 10/1999 |
| JP | A-60-131051 | 7/1985 |
| JP | A-3-265451 | 11/1991 |
| JP | A-4-29547 | 1/1992 |
| JP | A-4-54841 | 2/1992 |
| JP | A-6-133478 | 5/1994 |
| JP | A-11-164499 | 6/1999 |
| JP | A-2002-204561 | 7/2002 |
| JP | A-2002-223551 | 8/2002 |
| JP | A-2006-230125 | 8/2006 |
| JP | A-2006-280169 | 10/2006 |
| JP | A-2008-54392 | 3/2008 |
| WO | WO 02/29960 A1 | 4/2002 |

OTHER PUBLICATIONS

Apr. 17, 2012 Japanese Office Action issued in Japanese Patent Application No. 2010-076652 (with partial translation).

* cited by examiner

*Primary Examiner* — Tran Nguyen
*Assistant Examiner* — Jose Gonzalez Quinones
(74) *Attorney, Agent, or Firm* — Oliff & Berridge, PLC

(57) ABSTRACT

A rotor of alternator has core layer units serially located along axial direction. Each unit has a field coil generating magnetic flux and two rotor cores receiving the flux on respective sides of the coil in axial direction. Each core has a first yoke portion located on inner side of the coil, a second yoke portion extending from the first yoke portion toward the outer side and magnetic poles extending from the second yoke portion in the axial direction. The poles of one core and the poles of the other core in each unit extend toward different axial sides and are alternately arranged in circumferential direction on the outer side of the coil. A ratio of the outer circumferential diameter of the first yoke portions to the rotational diameter of the poles is lower than 0.54.

7 Claims, 15 Drawing Sheets

CIRCUMFERENTIAL
DIRECTION

AXIAL DIRECTION

ROTOR OF ELECTRIC ROTATING MACHINE INCLUDING NON-MAGNETIC BODY

CROSS-REFERENCE TO RELATED APPLICATION

This application is based upon and claims the benefit of priority of the prior Japanese Patent Application 2010-76652 filed on Mar. 30, 2010, so that the contents of which are incorporated herein by reference.

BACKGROUND OF THE INVENTION

1. Field of the Invention

The present invention relates to a rotor of an electric rotating machine such as an alternator for a vehicle.

2. Description of Related Art

An alternator mounted on a vehicle has a cylindrically-shaped stator and a rotor located in the center space of the stator. FIG. 1 is a side view, partially in cross section, of a rotor of an alternator according to a prior art. As shown in FIG. 1, a rotor 100 of an alternator has a rotational shaft 104 revolving on its shaft center, a single core layer 102 rotated on its central axis with the shaft 104, slip rings 106 through which electric current flows to the core layer 102, and fans 107 located on respective sides of the core layer 102 in the axial direction to cool the alternator. The core layer 102 has a single field coil 105 wound in a torus shape so as to place the shaft 104 on the central axis of the coil 105, a first rotor core 110 located so as to surround the coil 105 on the first axial side of rotor 100, and a second rotor core 111 located so as to surround the coil 105 on the second axial side of the rotor 100. Both ends of the coil 105 are connected with the respective slip rings 106.

Each of the cores 110 and 111 is composed of a cylindrical portion located on the inner side of the coil 105 in the radial direction, a yoke portion extending from the cylindrical portion toward the outer side in the radial direction, and a plurality of magnetic poles 117 extending from the yoke portion so as to face the outer circumferential surface of the coil 105 on the outer side of the coil 105. Each magnetic pole is formed in a claw shape. The magnetic poles of the core 110 and the magnetic poles of the core 111 are alternately arranged along the circumferential direction of the rotor 100. Therefore, each core is called a Lundell type core or a pole core. For example, Published Japanese Patent First Publication No. H11-164499 discloses an alternator having this Lundell type core.

When a field current is supplied to the coil 105 of the rotor 100 through the slip rings 106, a magnetic flux is generated by the coil 105 and passes through the cores 110 and 111 and a core of the stator (not shown). This magnetic flux indirectly extends from one of two magnetic poles of the cores 110 and 111, adjacent to each other in the circumferential direction, to the other pole through the stator core for each pair of poles, and directly extends from one of the cylindrical portions of the cores 110 and 111 to the other cylindrical portion. Therefore, a magnetic circuit is made up of the closed loop path of the magnetic flux extending between the rotor core 105 and the stator core.

More specifically, as shown in FIG. 1, lines of magnetic force are induced in the alternator. These magnetic force lines pass through the cross sectional area of the cores 110 and 111 perpendicular to the path surrounding the coil 105 without crossing with one another. For example, the Publication (No. H11-164499) shows magnetic force lines of a magnetic circuit (see FIG. 1 to FIG. 6 of the Publication). Therefore, when the rotor 100 is rotated, electric power is electromagnetically generated in the alternator.

This type of alternator is always required to be lightened in weight or to increase the generated electric power. For example, in the alternator disclosed in the Publication (No. H11-164499), a diameter R1 of a circle drawn by the rotated magnetic poles is defined as a rotational diameter of the magnetic poles (see FIG. 9 of the Publication), a diameter R2 of outer circumferential surfaces of the cylindrical portions is defined as an outer circumferential diameter (see FIG. 9 of the Publication) of the cylindrical portions, and a ratio R2/R1 of the outer circumferential diameter R2 to the rotational diameter R1 is set. Electric power generated per unit weight of the alternator is heightened at a specific ratio R2/R1 ranging from 0.54 to 0.60 (see FIG. 11 of the Publication).

However, in the conventional alternator, as the path of the magnetic force line surrounding the coil 105 is further away from the coil 105, the length of the magnetic path is increased, and magnetic reluctance or resistance along the magnetic path is increased. In other words, as the thickness of the rotor cores 110 and 111 in the direction perpendicular to the magnetic force lines is increased, the length of the magnetic path on the outer circumferential side of the cores 110 and 111 far away from the coil 105 is increased, and magnetic reluctance or resistance on the outer circumferential side of the cores 110 and 111 is increased.

Therefore, although the cross sectional area of the cores 110 and 111 perpendicular to the magnetic paths is increased with the thickness of the rotor cores 110 and 111 so as to lower magnetic reluctance or resistance of the cores 10 and 11, the weight of the alternator is increased with the thickness of the rotor cores 110 and 111, and magnetic reluctance or resistance on the outer circumferential side of the cores 110 and 111 is increased. In this case, to obtain a desired magnetic flux density in the alternator, the number of turns of a conductive line wound in the coil 105 and the field current supplied to the coil 105 are sometimes increased due to the high magnetic reluctance or resistance on the outer circumferential side of the cores 110 and 111.

Further, Published, Japanese Patent First Publication No. 2008-054392 corresponding to US Patent Application Publication No. 2008/0048516 A1 discloses an alternator in which a permanent magnet is fixedly located between two claw-shaped magnetic poles adjacent to each other in the circumferential direction for each pair of poles. In this alternator, the magnet between the magnetic poles acts so as to reduce a leaking magnetic flux directly passing between the magnetic poles. Therefore, the leaking magnetic flux not acting for the generation of electric power can be reduced, and electric power generated in the alternator can be increased.

However, the weight of the alternator disclosed in the Publication (No. 2008-054392) is undesirably increased by the magnets, and it is required to stably fix the magnets in the rotor. In this case, the electric power generated per unit weight is sometimes reduced.

SUMMARY OF THE INVENTION

An object of the present invention is to provide, with due consideration to the drawbacks of the conventional alternator, a rotor of an electric rotating machine which is lightened in weight so as to increase electric power generated per unit weight of the machine or rotational force generated per unit weight.

According to an aspect of this invention, the object is achieved by the provision of a rotor of an electric rotating machine, comprising a laminated body, having a plurality of core layer units serially located along an axial direction so as to place an outer magnetic body on an outer side of the core layer units in a radial direction, that is rotatable about a center axis extending along the axial direction. Each of the core layer units comprises a field coil wound in a cylindrical shape around the center axis of the laminated body, a first rotor core located on a first axial side of the field coil in the axial direction, and a second rotor core located on a second axial side of the field coil in the axial direction. The field coil generates a magnetic flux, the first rotor core receives the magnetic flux, and the second rotor core receives the magnetic flux. Each of the rotor cores comprises a first yoke portion formed in a cylindrical shape so as to be located on an inner side of the field coil, a second yoke portion extending from the first yoke portion toward the outer side of the field coil, and a plurality of claw-shaped magnetic poles, located on the outermost side of the second yoke portion so as to alternately arrange the magnetic poles of the first rotor core and the magnetic poles of the second rotor core in a circumferential direction on the outer side of the field coil. The magnetic flux directly extends from one of the first yoke portions of the rotor cores of each core layer unit to the other first yoke portion. The first yoke portions of the laminated body have an outer circumferential diameter equal to a distance from the central axis of the laminated body to outer circumferential surfaces of the first yoke portions in the radial direction. The magnetic flux indirectly extends from one magnetic pole in each pair of magnetic poles of the rotor cores, adjacent to each other in the circumferential direction, to the other magnetic pole through the outer magnetic body located on the outer side of the magnetic poles. The magnetic poles of the laminated body have a rotational diameter equal to a distance from the central axis of the laminated body to the magnetic poles in the radial direction. A ratio of the outer circumferential diameter to the rotational diameter is lower than 0.54.

With this structure of the rotor, in each of the core layer units, a magnetic flux is generated by the field coil, directly extends from the first yoke portion of one rotor core to the first yoke portion of the other rotor core, and indirectly extends from one magnetic pole in each pair of magnetic poles of the rotor cores, adjacent to each other in the circumferential direction, to another magnetic pole through the outer magnetic body. Therefore, the magnetic fluxes, required of the machine to generate a desired level of electric power or a desired level of rotational force, are distributed to the core layer units.

In this case, as compared with a conventional rotor having a single field coil and two rotor cores placing the coil between the cores, the number of turns in each field coil generating one of the distributed magnetic fluxes can be reduced so as to lighten the total weight of the field coils.

Further, because the core layer units are serially located along the axial direction, the length of each core layer unit in the axial direction is shortened, as compared with the conventional rotor. In this case, because the cores are necessarily thinned in the axial direction, the path of the magnetic flux passing through the cores while surrounding the field coil is shortened so as to reduce magnetic reluctance or resistance caused in the cores, and the difference in the path lengths of magnetic force lines in the cores is reduced so as to uniformly set the density of the magnetic flux in the cores. Therefore, the magnetic flux density can be heightened.

Accordingly, the rotor can be lightened in weight or can increase the magnetic flux density so as to increase the electric power or the rotational force generated per unit weight in the machine.

DETAILED DESCRIPTION OF THE PREFERRED EMBODIMENTS

Figure 1:
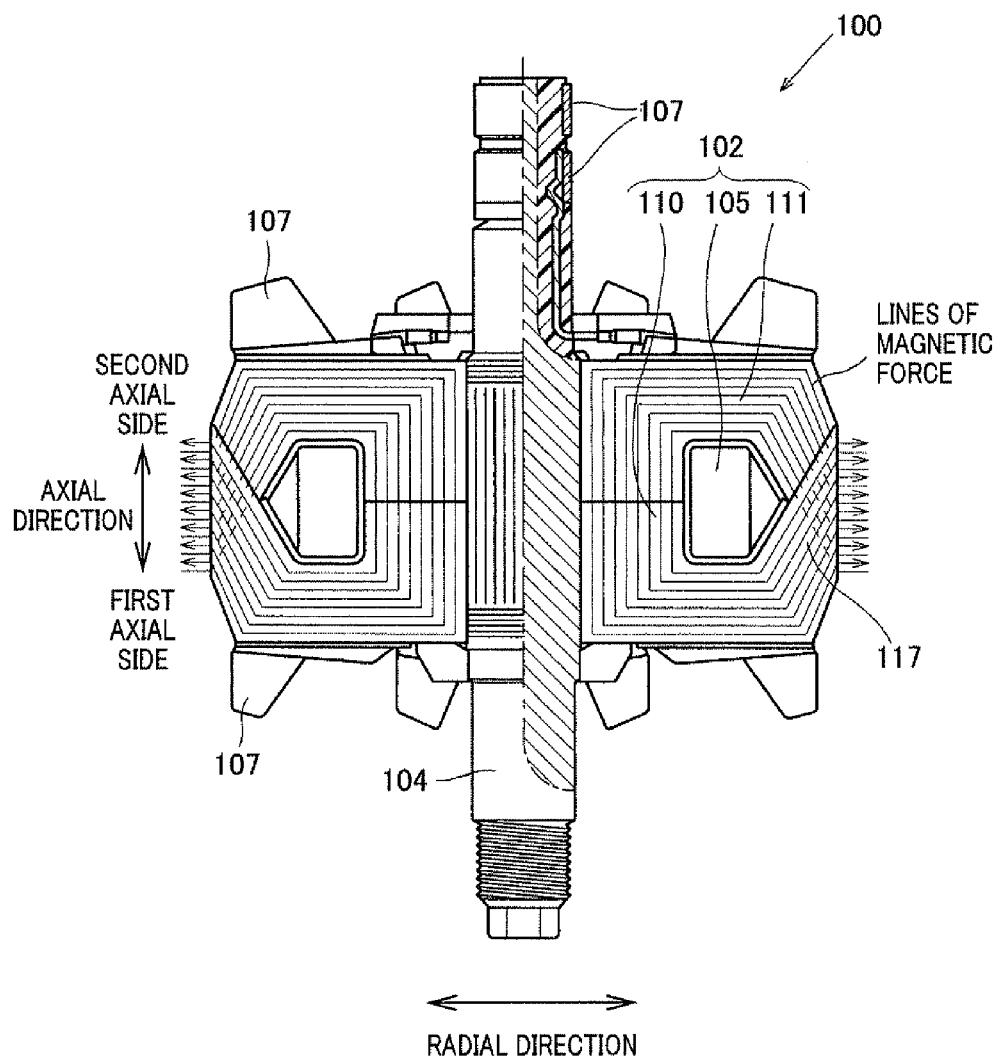
FIG. 1 is a side view, partially in cross section, of a rotor of an alternator according to a prior art.

Embodiments of the present invention will now be described with reference to the accompanying drawings, in which like reference numerals indicate like parts, members or elements throughout the specification unless otherwise indicated.

First Embodiment

Figure 2:
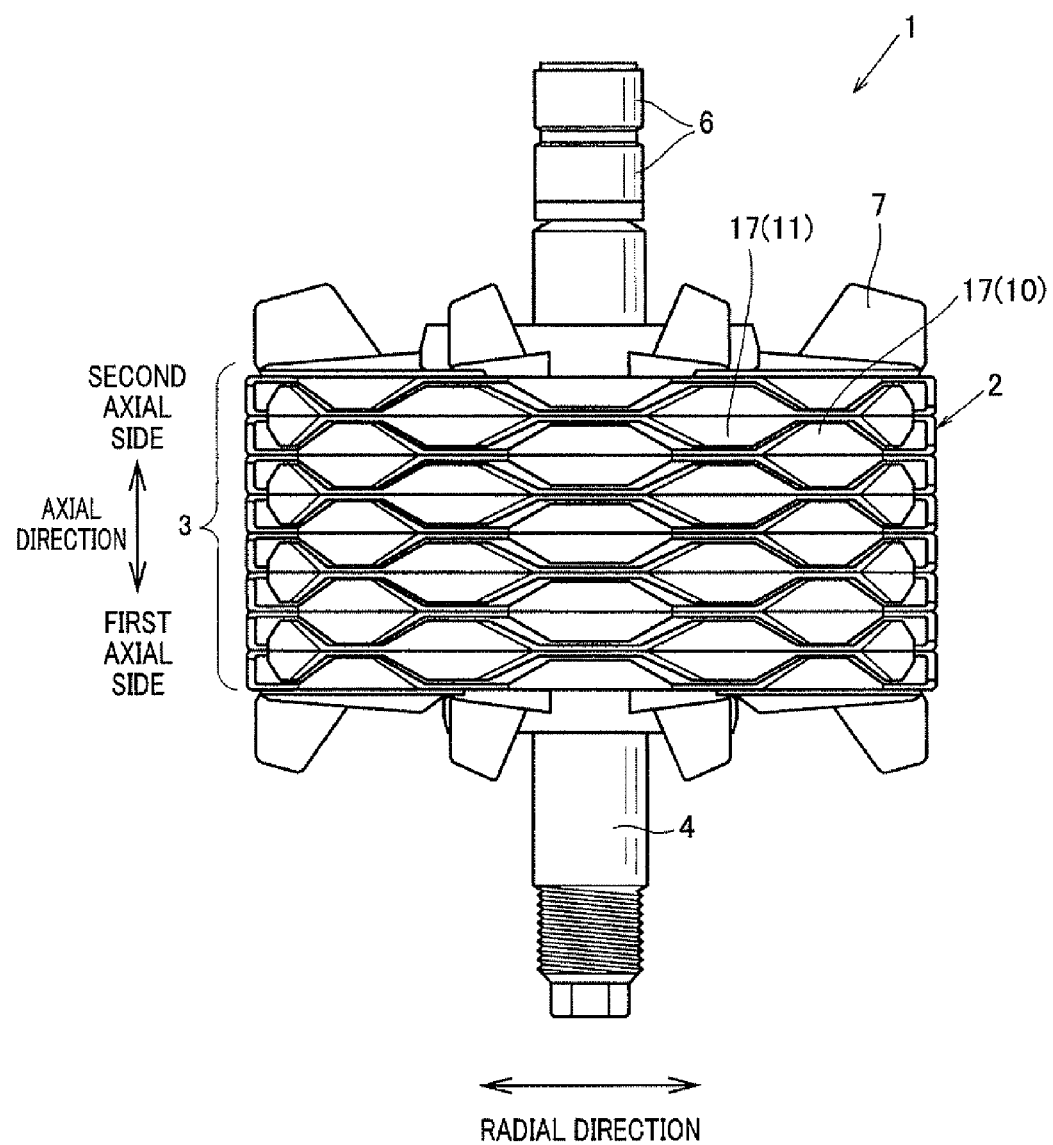
FIG. 2 is a side view of a rotor of an electric rotating machine according to the first embodiment of the present invention.
Figure 3:
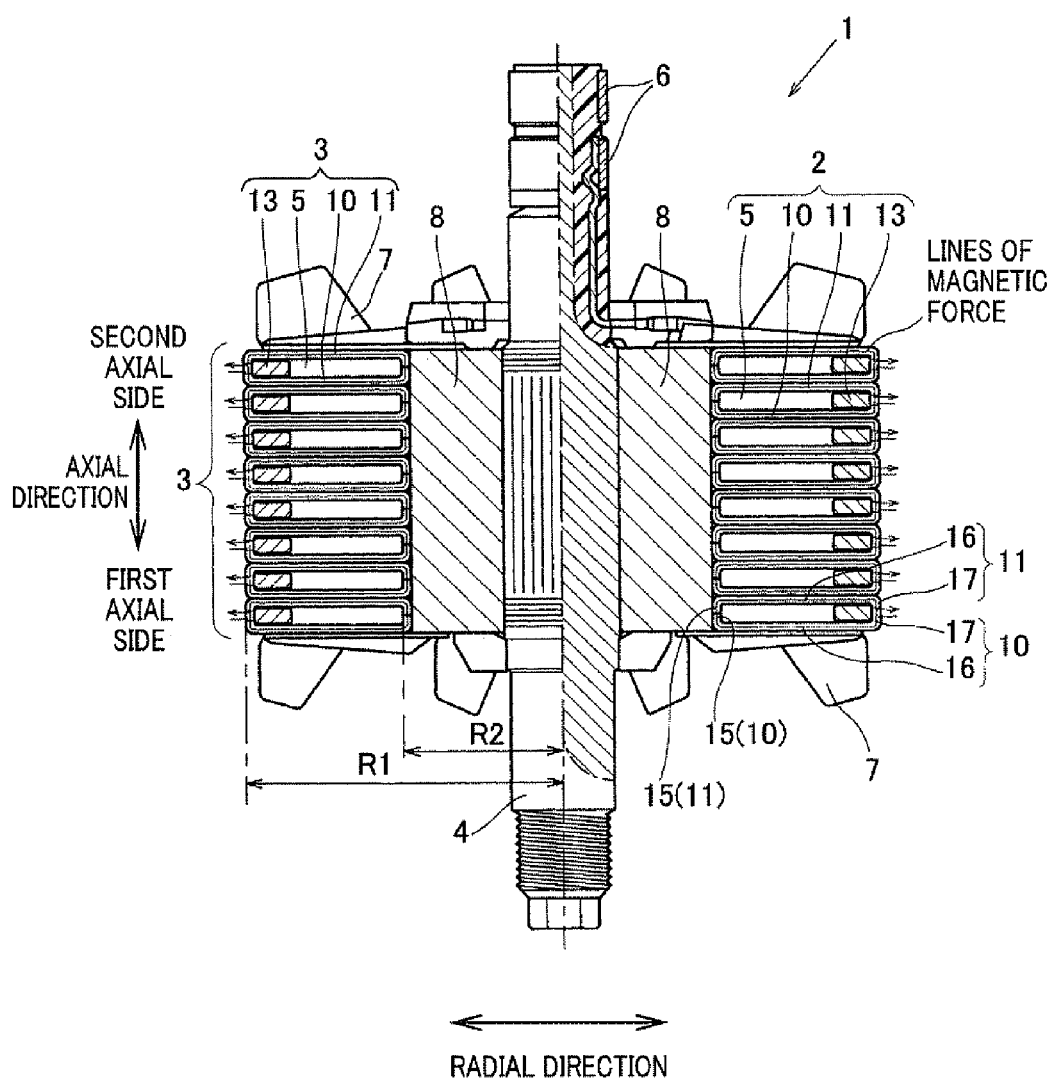
FIG. 3 is a side view, partially in cross section, of the rotor shown in FIG. 2.

FIG. 2 is a side view of a rotor of an electric rotating machine according to the first embodiment, while FIG. 3 is a side view, partially in cross section, of the rotor. An electric rotating machine is, for example, used as an alternator mounted on a vehicle. As shown in FIG. 2 and FIG. 3, this alternator representing the machine has a rotor 1 and a cylindrically-shaped stator (not shown) surrounding the rotor 1 on the outer side of the rotor 1 in the radial direction of the rotor 1. The rotor 1 has a laminated body 3 formed in a torus or cylindrical shape, a rotational shaft 4 located along the central axis of the body 3 so as to revolve on its shaft center, two slip rings 6 attached to the shaft 4 such that electric current flows to the body 3 through the rings 6, fans 7 fixedly located on respective axial side surfaces of the body 3, and a spacer 8 located between the body 3 and the shaft 4 and fixed to the body 3 and the shaft 4. The spacer 8 is made of non-magnetic metallic material or resin, and the specific gravity of the spacer 8 can be lower than the specific gravity of the laminated body 3.

Further, a pulley (not shown) is attached to the shaft 4 on a first axial side of the rotor 1 in the axial direction perpendicular to the radial direction. The slip rings 6 are located on a second axial side of the rotor 1 opposite to the first axial side. In response to the generation of a rotational force in an engine of the vehicle, this force is transmitted to the shaft 4 through the pulley, and the shaft 4 is rotated on its shaft center. Because the laminated body 3 and the spacer 8 are fixed to the shaft 4, the rotor 1 is rotated as one body on the axis of rotation (i.e., the shaft center of the shaft 4) by the force.

The laminated body 3 has a plurality of core layer units 2 (preferably, three core layer units 2 or more) serially located along the axial direction. Therefore, the alternator is formed in a tandem structure.

Figure 4:
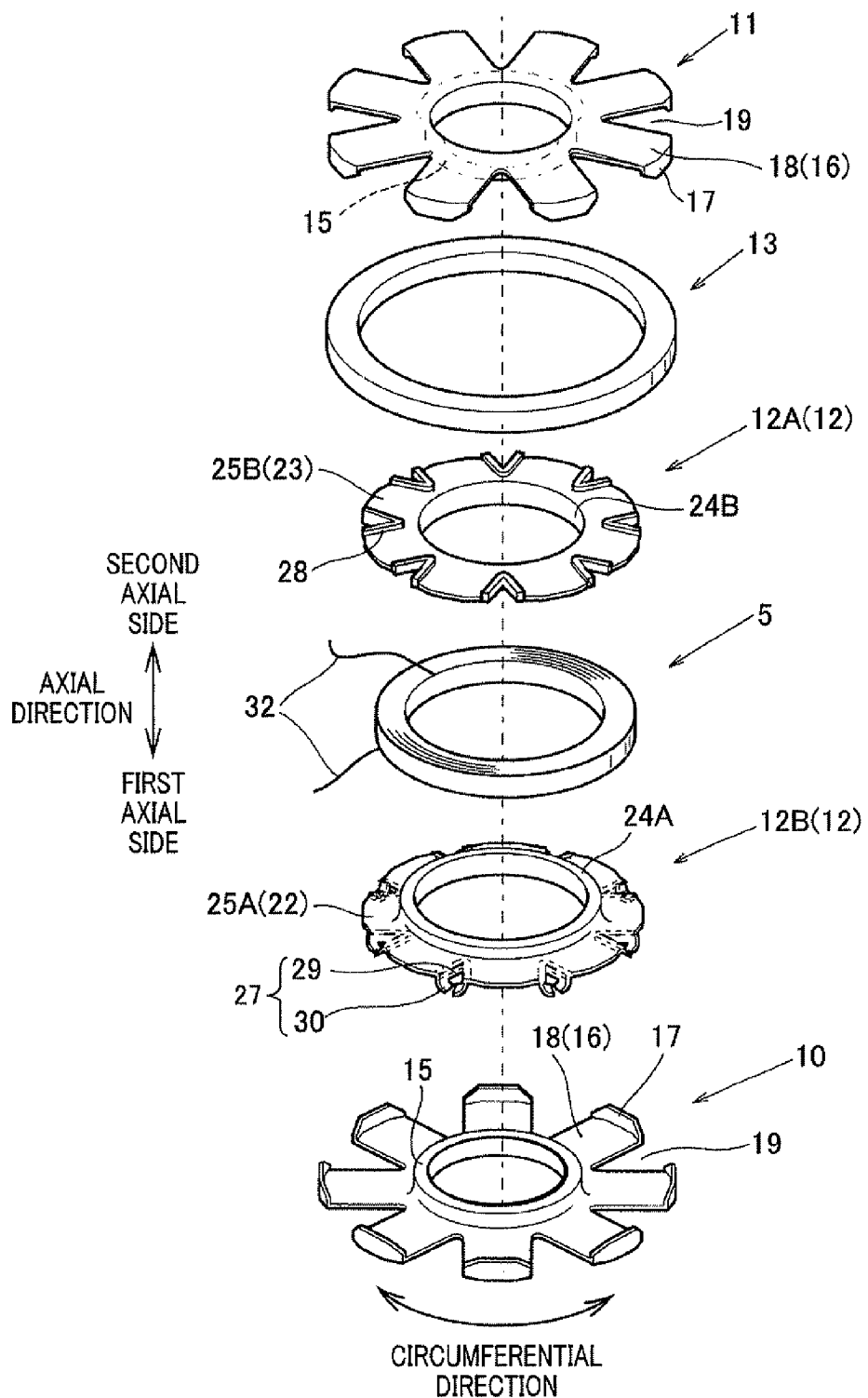
FIG. 4 is an exploded view of one of core layer units serially located in the rotor shown in FIG. 2.

FIG. 4 is an exploded view of one of the core layer units 2. As shown in FIG. 3 and FIG. 4, each core layer unit 2 has a field coil 5 wound in a cylindrical shape, a first rotor core 10 located on the first axial side of the coil 5, a second rotor core 10 located on the second axial side of the coil 5 so as to place the coil 5 between the cores 10 and 11 in the axial direction, a first plate-shaped insulating member 12A made of resin to electrically insulate the coil 5 from the core 10 on the first axial side of the coil 5, a second plate-shaped insulating member 12B made of resin to insulate the coil 5 from the core 11 on the second axial side of the coil 5, and a ring-shaped body 13 made of non-magnetic material in a ring shape to be located between the cores 10 and 11 in the axial direction and to be placed on the outer side of the coil 5 in the radial direction.

The insulating members 12A and 12B are combined with each other as a bobbin 12, and the coil 5 is wound on the bobbin 12.

Figure 5A:
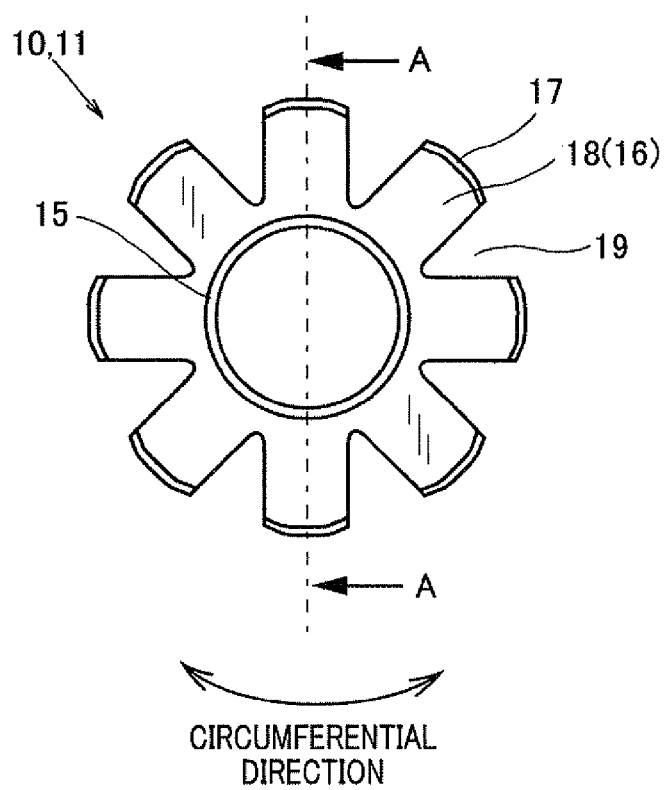
FIG. 5A is a plan view of a rotor core of the core layer unit shown in FIG. 4.
Figure 5B:
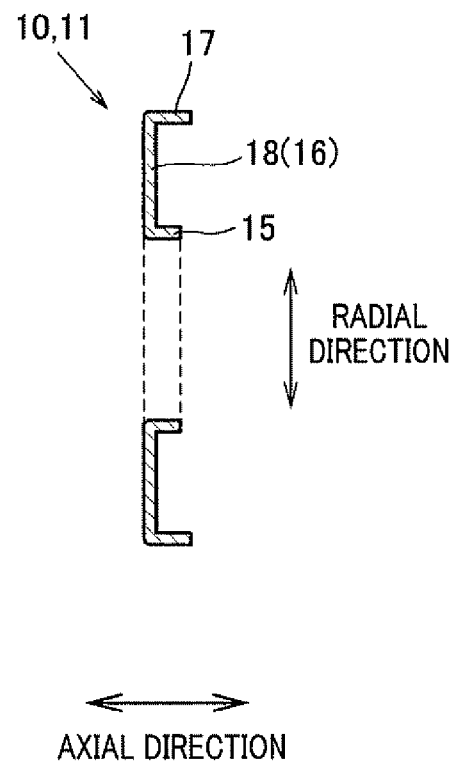
FIG. 5B is a sectional view taken substantially along line A-A of FIG. 5A.

FIG. 5A is a plan view of the rotor core 10 or 11, while FIG. 5B is a sectional view taken substantially along line A-A of FIG. 5A. The cores 10 and 11 are substantially formed in the same structure. As shown in FIG. 4, FIG. 5A and FIG. 5B, each of the cores 10 and 11 is composed of a first yoke portion 15 formed in a cylindrical shape to face the spacer 8, a second yoke portion 16 extending from the portion 15 toward the outer side, and a plurality of claw-shaped magnetic poles 17 extending from the portion 16 on the outermost side of the portion 16. The poles 17 of the core 10 extend toward the second axial side, and the poles 17 of the core 11 extend toward the first axial side. Therefore, the rotor 1 has Lundell type cores or pole cores.

Each portion 16 has a plurality of plate-shaped branches 18 branched out in all directions toward the outer side, and each magnetic pole 17 is located on the outermost end of one branch 18. Therefore, a fan-shaped planar space 19 is formed between two branches 18 adjacent to each other in each pair.

As shown in FIG. 2 and FIG. 4, the magnetic poles 17 of the core 10 and the magnetic poles 17 of the core 11 in each core layer unit 2 are alternately arranged along the circumferential direction perpendicular to the radial and axial directions. As shown in FIG. 2, in each pair of two core layer units 2 adjacent to each other in the axial direction, each magnetic pole 17 of the core 11 in the unit 2 located on the first axial side is substantially placed at the same position in the circumferential direction as the position of one magnetic pole 17 of the core 10 in the other unit 2 located on the second axial side. Therefore, the second yoke portions 16 of the core 11 in the unit 2 located on the first axial side face the respective second yoke portions 16 of the core 11 in the other unit 2, located on the second axial side, in the axial direction.

As shown in FIG. 3, in the core layer units 2, the magnetic poles 17 of the cores 10 and 11 have a rotational diameter R1, and the first yoke portions 15 of the cores 10 and 11 have an outer circumferential diameter R2. In other words, the field coils 5 have an inner diameter R2. The diameter R1 is defined as a distance from the rotation axis of the rotor 1 (i.e., the central axis of the laminated body 3) to the magnetic poles 17 in the radial direction. The poles 17 in each core layer unit 2 are rotated with the shaft 4 at the rotational diameter R1. The diameter R2 is defined as a distance from the rotation axis of the rotor 1 to outer circumferential surfaces of the first yoke portions 15 in the radial direction. The portions 15 in each core layer unit 2 are rotated with the shaft 4 at the diameter R2.

In this embodiment, the ratio R2/R1 of the outer circumferential diameter R2 to the rotational diameter R1 is set at a value lower than 0.54 and is equal to or higher than 0.16 ($0.16 \leq R2/R1 < 0.54$).

Figure 6A:
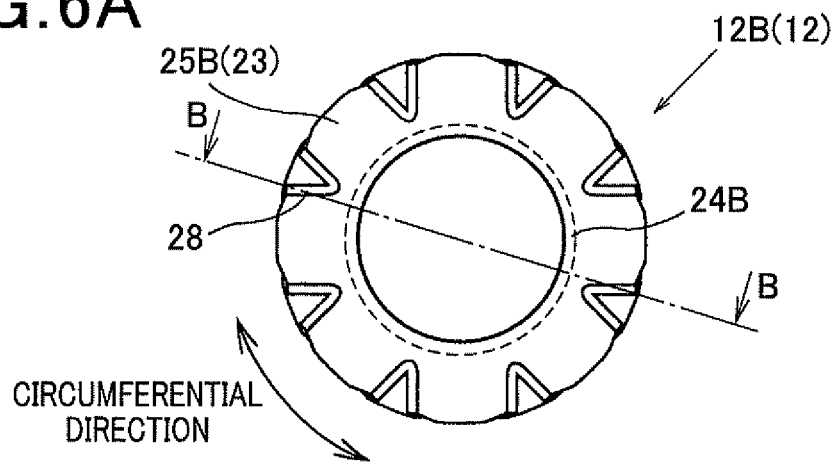
FIG. 6A is a plan view of a bobbin of one core layer unit seen from a second axial side.
Figure 6B:
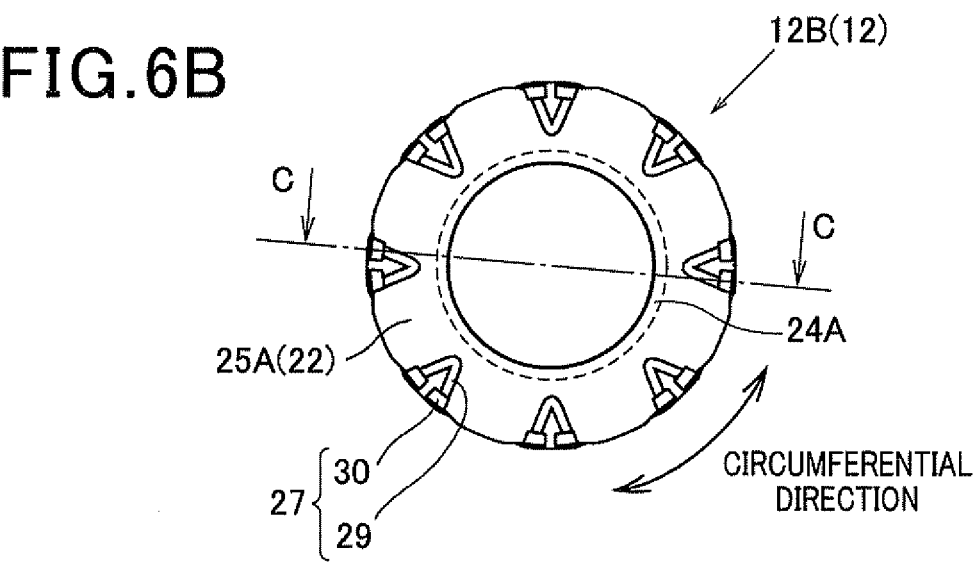
FIG. 6B is a plan view of the bobbin seen from a first axial side.
Figure 6C:
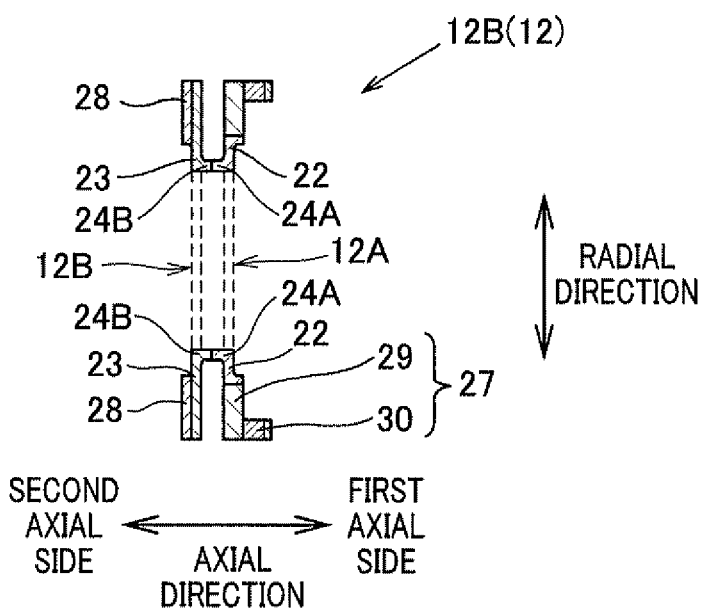
FIG. 6C is a combined view of a sectional view taken substantially along line B-B of FIG. 6A and a sectional view taken substantially along line C-C of FIG. 6B.

FIG. 6A is a plan view of the bobbin 12 seen from the second axial side, FIG. 6B is a plan view of the bobbin 12 seen from the first axial side, and FIG. 6C is a combined view of a sectional view taken substantially along line B-B of FIG. 6A and a sectional view taken substantially along line C-C of FIG. 6B. The bobbin 12 in each core layer unit 2 is composed of the insulating members 12A and 12B combined with each other (see FIG. 4). As shown in FIG. 4, FIG. 6A, FIG. 6B and FIG. 6C, in each core layer unit 2, the member 12A of the bobbin 12 has a coil winding portion 24A formed in a cylindrical shape and a planar insulating portion 22 extending from the portion 24A toward the outer side. The portion 24A has an outer circumferential surface on which the coil 5 is wound. The insulating portion 22 has a plurality of plate-shaped branches 25A branched out in all directions toward the outer side. The member 12B of the bobbin 12 has a coil winding portion 24B formed in a cylindrical shape and a planar insulating portion 23 extending from the portion 24B toward the outer side. The portion 24B has an outer circumferential surface on which the coil 5 is wound. The insulating portion 23 has a plurality of plate-shaped branches 25B branched out in all directions toward the outer side. The portions 24A and 24B of the insulating members 12A and 12B are aligned along the axial direction and are attached to each other to form the bobbin 12 composed of the insulating members 12A and 12B. The number of branches 25A in one insulating member 12A and the number of branches 25B in one insulating member 12B are the same and are equal to the number of branches 18 in each of the cores 10 and 11.

Further, the insulating portion 22 of the member 12A has a plurality of hooks 27 located along the circumferential direction on the outer side, and each hook 27 is located on side ends of two branches 25A facing each other in the circumferential direction. Each hook 27 has two first hook portions 29 and two second hook portions 30. The hook portions 29 extend from the respective side ends of the branches 25A toward the first axial side so as to be formed almost in a V shape. The second hook portions 30 extend from respective outer ends of the portions 29 toward the first axial side while approaching each other in the circumferential direction, are bent toward the second axial side, and extend toward the second axial side while approaching each other in the circumferential direction. The insulating portion 23 of the insulating member 12B has a plurality of hooks 28 located along the circumferential direction on the outer side, and each hook 28 extends from side ends of two branches 25B, facing each other in the circumferential direction, toward the second axial side so as to be formed almost in a V shape.

Figure 7A:
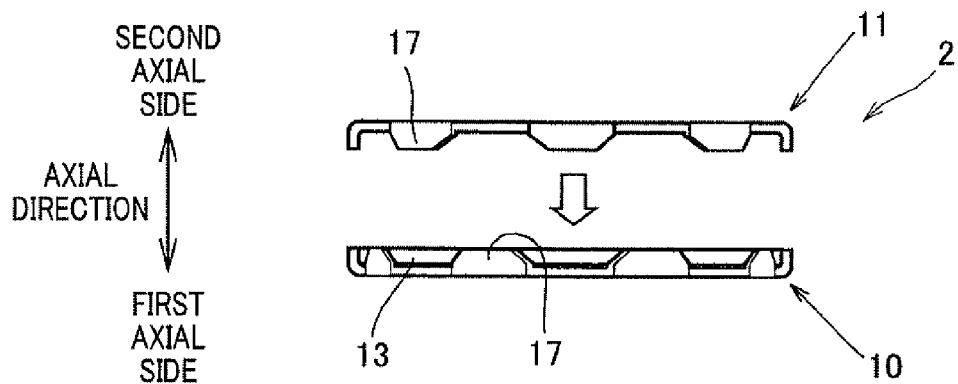
FIG. 7A is a side view of one core layer unit before assembling a second rotor core into the unit.
Figure 7B:
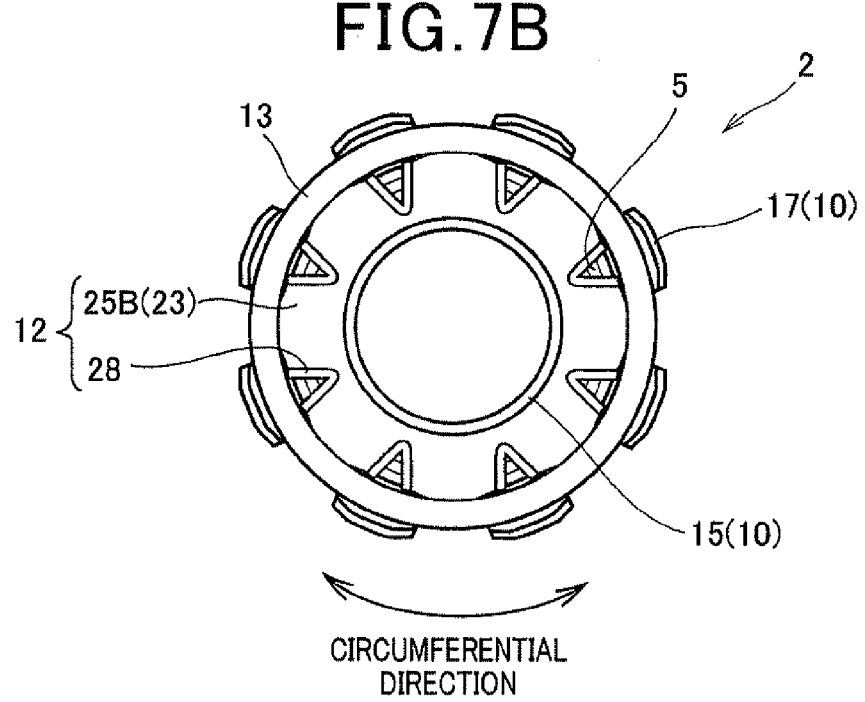
FIG. 7B is a plan view of the core layer unit, not yet receiving a second rotor core, seen from the second axial side.
Figure 8A:
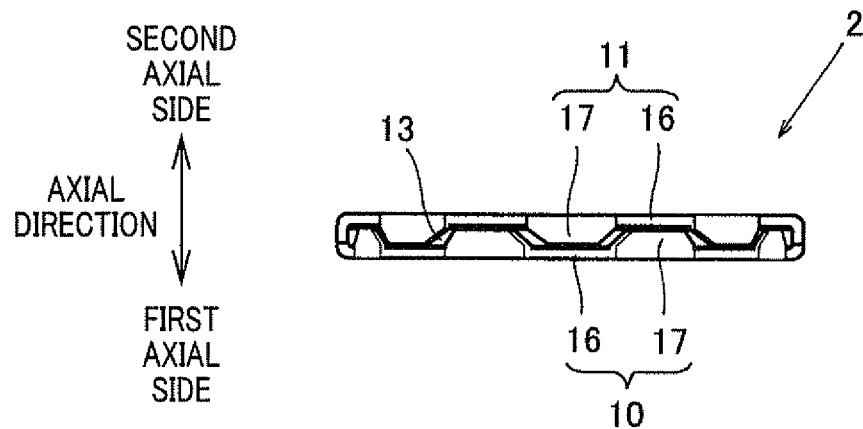
FIG. 8A is a side view of one core layer unit shown in FIG. 4.
Figure 8B:
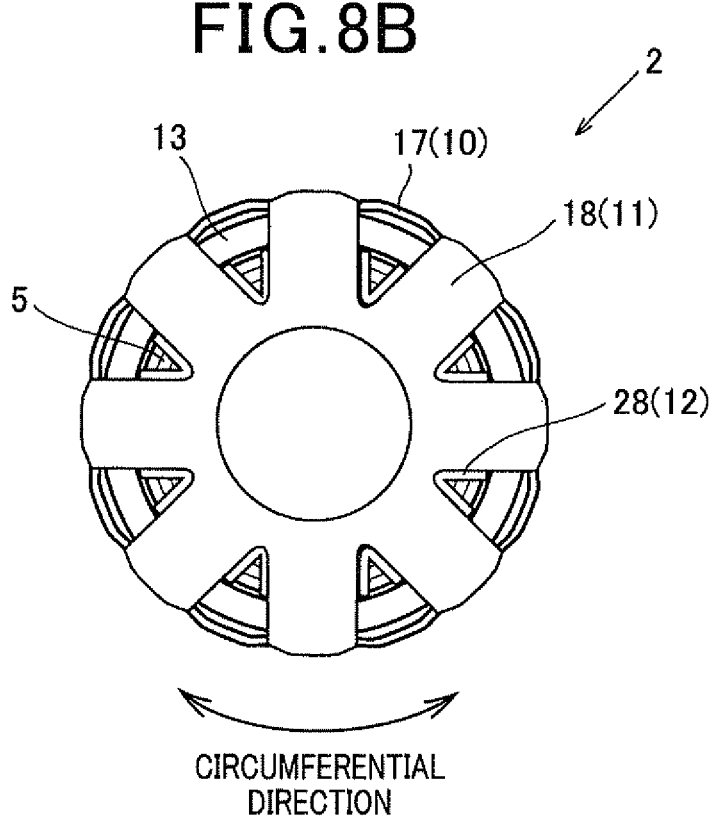
FIG. 8B is a plan view of the core layer unit seen from the second axial side.

FIG. 7A is a side view of one core layer unit 2 before assembling the core 11 into the unit 2, while FIG. 7B is a plan view of the core layer unit 2, not yet receiving the core 11, seen from the second axial side. FIG. 8A is a side view of one core layer unit 2, while FIG. 8B is a plan view of the core layer unit 2 seen from the second axial side. As shown in FIG. 3, FIG. 4, FIG. 7A, FIG. 7B, FIG. 8A and FIG. 8B, in each core layer unit 2, the coil 5 is placed between the cores 10 and 11 in the axial direction, and the magnetic poles 17 of the core 10 and the magnetic poles 17 of the core 11 are alternately located along the circumferential direction so as to surround the coil 5 and the body 13 on the outer side.

Further, in each core layer unit 2, the insulating portion 22 of the member 12A is located between the coil 5 and the core 10 such that each branch 25A of the member 12A is substantially placed at the same position in the circumferential direction as the position of one branch 18 of the core 10 (see FIG. 4). Therefore, the member 12A electrically insulates the coil 5 from the core 10 on the first axial side of the coil 5. The insulating portion 23 of the member 12B is located between the coil 5 and the core 11 such that each branch 25B of the member 12B is substantially placed at the same position in the circumferential direction as the position of one branch 18 of the core 11 (see FIG. 4, FIG. 7B and FIG. 8B). Each hook 28 of the member 12B is located into one space 19 of the core 11 so as to be in contact with two branches 18 of the core 11 facing the space 19. Therefore, the member 12B electrically insulates the coil 5 from the core 11 on the second axial side of the coil 5.

As shown in FIG. 3, FIG. 4, FIG. 7A, FIG. 7B, FIG. 8A and FIG. 8B, the ring-shaped body 13 made of non-magnetic material is located on the inner side of the magnetic poles 17 of the cores 10 and 11 and is located on the outer side of the coil 5. Therefore, during the rotation of the rotor 1, the body 13 can prevent the coil 5 from being moved toward the outer side due to the generated centrifugal force.

Further, the body 13 acts as a first non-magnetic body which is located on the second axial side of the core 10 to be in contact with the second yoke portion 16 of the core 10 on the inner side of the magnetic poles 17 of the core 10 and to press the portion 16 from the second axial side, and the body 13 acts as a second non-magnetic body which is located on the first axial side of the core 11 to be in contact with the second yoke portion 16 of the core lion the inner side of the magnetic poles 17 of the core 11 and to press the portion 16 from the first axial side. That is, the first and second non-magnetic bodies constitute the body 13.

Figure 9A:
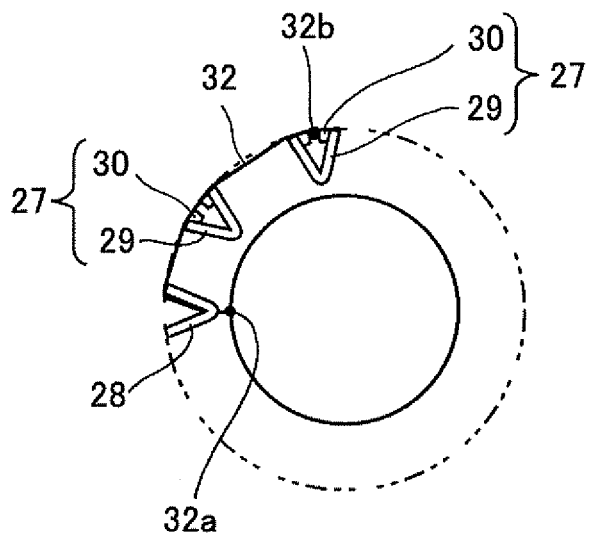
FIG. 9A is an explanatory plan view of hooks seen from the first axial side and a hook seen from the second axial side to show one crossover line in the hooks.
Figure 9B:
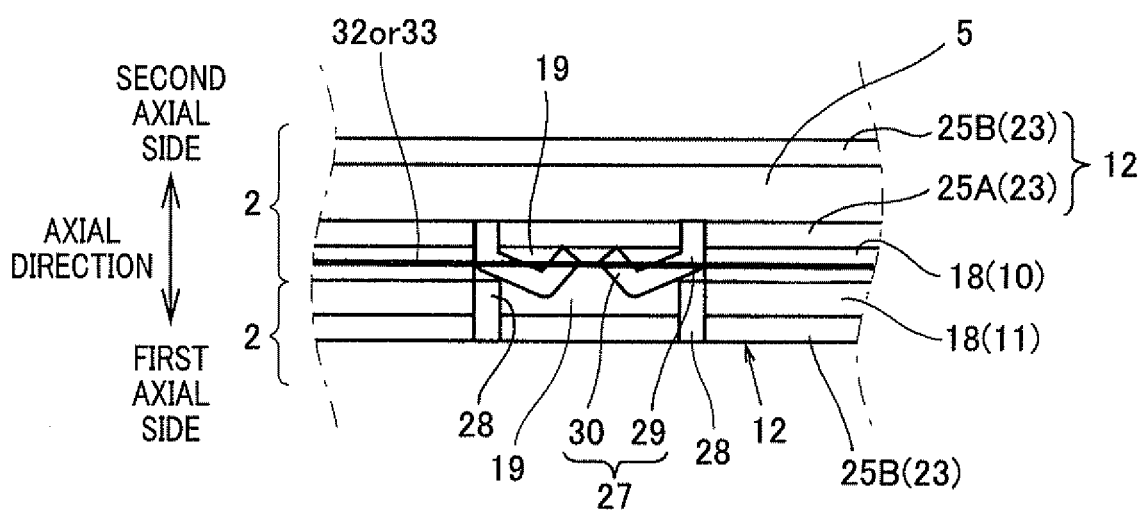
FIG. 9B is an explanatory side view showing one crossover or leading line caught by one hook of a bobbin shown in FIG. 4.

As shown in FIG. 4, a crossover line 32 or a leading line 33 extends from the innermost side of the coil 5, and another crossover line 32 or another leading line 33 extends from the outermost side of the coil 5. FIG. 9A is an explanatory plan view of hooks 27 seen from the first axial side and one hook 28 seen from the second axial side to show one crossover line 32 caught by one hook 27 and passing through the hook 28, while FIG. 9B is an explanatory side view showing one crossover or leading line 32 or 33 caught by the hook 37. As shown in FIG. 8B and FIG. 9B, each hook 28 of the bobbin 12 is located into one space 19 of the core 11 so as to be in contact with two branches 18 of the core 11 facing the space 19. As shown in FIG. 9B, each hook 27 of the bobbin 12 is located into one space 19 of the core 10 and one space 19 of the core 11 so as to be in contact with two branches 18 of the core 10 facing the space 19 of the core 10. Therefore, the relative movement of the bobbin 12 and the cores 10 and 12 to one another in the circumferential direction can be prevented.

As shown in FIG. 9B, in each pair of two core layer units 2 adjacent to each other in the axial direction, each hook portion 29 of the hooks 27 of the bobbin 12 in one core layer unit 2 located on the second axial side is located so as to be in contact with one hook 28 of the bobbin 12 in the other core layer unit 2 located on the first axial side. Further, the portion 30 of each hook 27 is bent. Therefore, the crossover lines 32 and the leading lines 33 of the coils 5 can be tightly caught by the portions 30 of the hooks 27 so as to be fixedly located in the rotor 1.

As shown in FIG. 9A, in each pair of two coils 5 adjacent to each other in the axial direction, the crossover line 32 extends from an inner end 32a of the coil 5 located on the first axial side toward the outer side of the coil 5, passes through the fan-shaped space of one hook 28 of the bobbin 12 on which the coil 5 located on the first axial side is wound, and is caught by one hook 27 of the bobbin 12, on which the coil 5 located on the second axial side is wound, while passing through the fan-shaped space of the hook 27. That is, the crossover line 32 serially connecting two coils 5 adjacent to each other in the axial direction is taken out from both the hook 28 of the bobbin 12, on which the coil 5 located on the first axial side is wound, and the hook 27 of the bobbin 12 on which the coil 5 located on the second axial side is wound.

Further, in each pair of two coils 5 adjacent to each other in the axial direction, the leading line 33a is taken out from both the hook 28 of the bobbin 12, on which the coil 5 located on the first axial side is wound, and the hook 27 of the bobbin 12 on which the coil 5 located on the second axial side is wound. Then, the leading line 33a is taken out from one hook 28 of the bobbin 12 on which the coil 5 located at the end of the laminated body 3 on the second axial side is wound. The leading line 33b is taken out from one hook 28 of the bobbin 12 on which the coil 5 located at the end of the laminated body 3 on the second axial side is wound.

Figure 10:
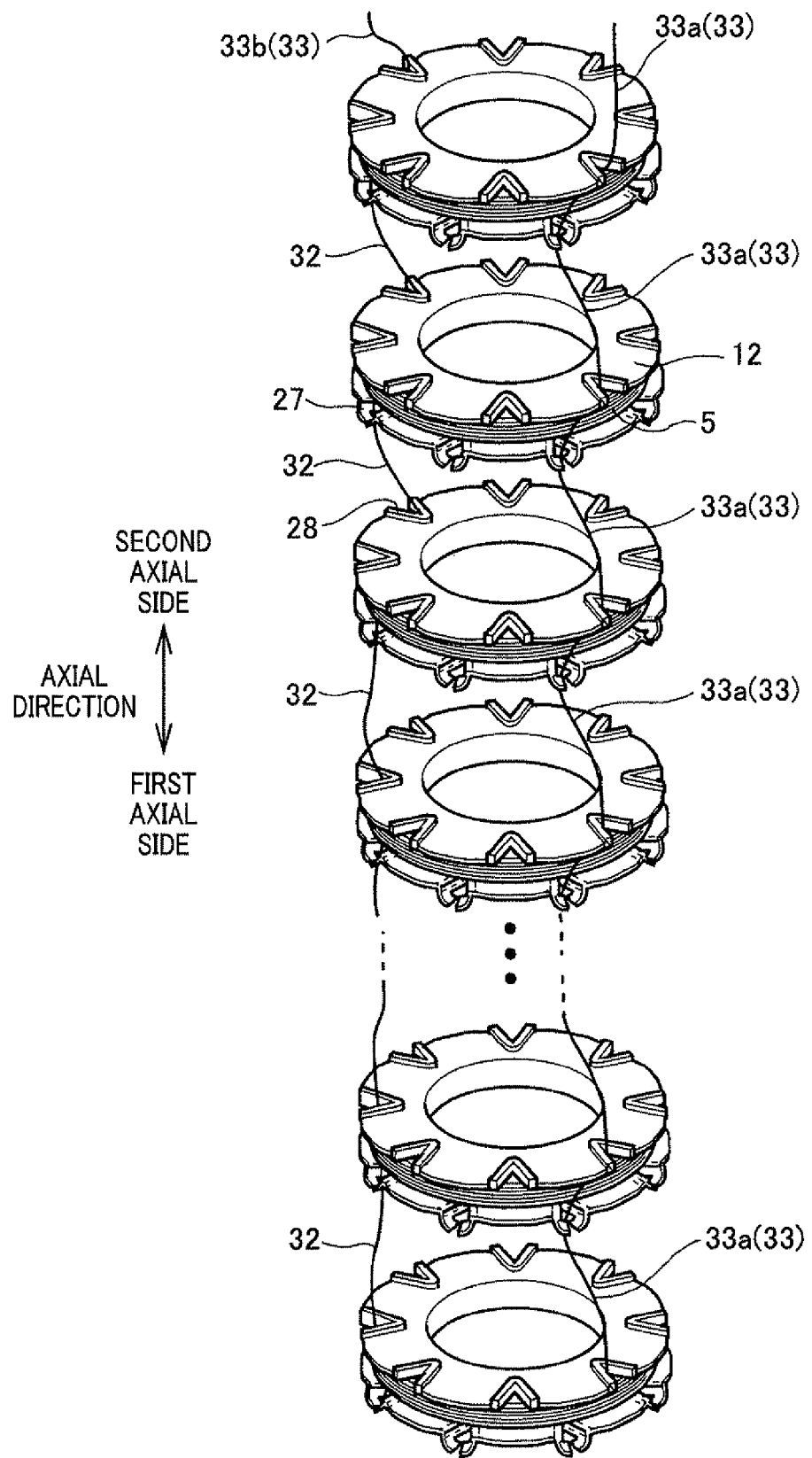
FIG. 10 is an exploded view explanatorily showing coils serially connected with one another through crossover lines and leading lines.

FIG. 10 is an exploded view explanatorily showing the coils 5 of the core layer units 2 serially connected with one another through the crossover lines 32 and the leading lines 33. As shown in FIG. 10, in each pair of two core layer units 2 adjacent to each other in the axial direction, the coils 5 of the core layer units 2 are electrically connected with each other through the crossover line 32 extending from the innermost side of the coil 5 of the core layer unit 2 located on the first axial side and extending from the outermost side of the coil 5 of the core layer unit 2 located on the second axial side. The coil 5 of the core layer unit 2 located at one end of the laminated body 3 on the first axial side is electrically connected with one slip ring 6 through the leading line 33 (hereinafter, called the leading line 33a) extending from the outermost side of the coil 5. The coil 5 of the core layer unit 2 located at the other end of the laminated body 3 on the second axial side is electrically connected with the other slip ring 6 through the leading line 33 (hereinafter, called the leading line 33b) extending from the innermost side of the coil 5.

Therefore, one conductive line is formed by the leading line 33a, the coil 5 of the core layer unit 2 located at the end of the laminated body 3 on the first axial side, the crossover lines 32 and the coils 5 of the other core layer units 2, and the leading line 33b arranged in that order.

When a field current is supplied to the coils 5 serially connected with one another by the crossover lines 32 and the leading lines 33a and 33b through the slip rings 6, a magnetic flux is generated by the coil 5 in each core layer unit 2. This generated magnetic flux indirectly extends from one magnetic pole 17 in each pair of magnetic poles 17 of the cores 10 and 11, adjacent to each other in the circumferential direction, to the other magnetic pole 17 through a core (i.e., an outer magnetic body) of the stator located on the outer side of the poles 17, and directly extends from one of the first yoke portions 15 of the cores 10 and 11 to the other first yoke portion 15. Therefore, a magnetic circuit is made up of the cores 10 and 11 and the stator core. When the shaft 4 is rotated by a rotational force generated in an engine of the vehicle while the field current is supplied to the coils 5 of the core layer units 2 through the rings 6, electric power is generated in a coil (not shown) wound on the stator core.

As described above, in the rotor 1 according to this embodiment, the core layer units 2 are serially located along the axial direction, and the rotational diameter R1 of the magnetic poles 17 of the cores 10 and 11 and the outer circumferential diameter R2 of the first yoke portions 15 of the cores 10 and 11 satisfy the ratio R2/R1 lower than 0.54. Accordingly, as compared with the prior art, the magnetic flux density (or magnetic induction) in the rotor 1 can be heightened so as to generate higher electric power, and the weight of the cores 10 and 11 in the laminated body 3 can be reduced so as to heighten electric power generated per unit weight of the alternator.

More specifically, because the rotor 100 shown in FIG. 1 has only the single core layer unit composed of the coil 105 and the cores 110 and 111, the thickness of the cores 110 and 111 becomes large. In this case, paths of magnetic force lines passing through the thickened cores 110 and 111 while surrounding the coil 105 are lengthened, so that magnetic reluctance or resistance along the magnetic paths is inevitably increased so as to lower the density of magnetic flux in the cores 110 and 111. Further, as the magnetic force line passing through the cores 110 and 111 is further away from the coil 105, the length of the magnetic force line is increased. Therefore, the difference in the lengths of the magnetic force lines passing through the cores 110 and 111 becomes large, so that the magnetic flux density cannot be uniformly set in the thickened cores 110 and 111.

To achieve a high average density of magnetic flux for the purpose of obtaining a desired level of electric power or rotational force in an alternator having the rotor 100, it is inevitably required to increase the number of turns in the coil 105 and/or to heighten the field current supplied to the coil 105. As a result, the weight of the rotor 100 is increased, and electric power cannot be efficiently generated.

In contrast, in the rotor 1 according to this embodiment, many core layer units 2 (preferably, three core layer units 2 or more) are serially located along the axial direction, and electric power is generated in the stator surrounding the units 2 due to the electromagnetic interaction between the stator and each unit 2. Because the length of each unit 2 in the axial direction is shortened, the thickness of the cores 10 and 11 in the axial direction becomes small. In this case, in each core layer unit 2, the distance from the coil 5 to lines of magnetic force passing through the cores 10 and 11 becomes short so as to shorten paths of the magnetic force lines surrounding the coil 5. Therefore, magnetic reluctance or resistance along the magnetic paths can be considerably reduced. Accordingly, the magnetic flux density (or magnetic induction) can be efficiently heightened in response to the field current supplied to the coil 5, and electric power can be efficiently generated. Further, because the thickness of the cores 10 and 11 in the axial direction is small, the difference in the magnetic paths is reduced. Therefore, in each core layer unit 2, the magnetic flux density can be uniformly set in the cores 10 and 11. Accordingly, electric power can be further efficiently generated.

Further, because many core layer units 2 are serially located along the axial direction, the thickness of the second yoke portions 16 of the cores 10 and 11 in the axial direction becomes small, the length of the first yoke portions 15 of the cores 10 and 11 in the axial direction is shortened, and the length of the magnetic poles 17 of the cores 10 and 11 in the axial direction is shortened. Because of the portions 16 thinned in the axial direction, the thickness of the portions 15 in the radial direction can be reduced, and the thickness of the magnetic poles 17 of the cores 10 and 11 in the radial direction can be reduced. Therefore, the total weight of the cores 10 and 11 in the rotor 1 can be considerably reduced as compared with the total weight of the cores 110 and 111 of the rotor 100 shown in FIG. 1. Accordingly, the rotor 1 can be lightened in weight, and electric power generated per unit weight of the alternator can be heightened.

Moreover, the spacer 8 having the specific gravity lower than the specific gravity of the units 2 is located in the inner side of the core layer units 2 in the radial direction. Therefore, the length of the second yoke portions 16 of the cores 10 and 11 in the radial direction can be reduced. Accordingly, the rotor 1 can be further lightened in weight.

Furthermore, in the alternator 100 shown in FIG. 1, the electric power generated per unit weight reaches a highest value at the ratio R2/R1 set at 0.56. However, in the alternator according to this embodiment, because of the reduction of magnetic reluctance or resistance and the lightening of the weight, the electric power generated per unit weight at the ratio R2/R1 lower than 0.54 can be set to be higher than the highest value in the alternator 100.

Still further, because the thickness of the cores 10 and 11 is considerably reduced, eddy current is hardly generated in the cores 10 and 11. Accordingly, the loss of magnetic energy can be reduced so as to efficiently generate electric power.

Still further, the length of the magnetic poles 17 in the axial direction is considerably reduced. Therefore, even when the magnetic poles 17 receives the centrifugal force caused during the rotation of the rotor 1 and/or the magnetic attractive force applied from the stator core, the inclination of the magnetic poles 17 to the radial direction hardly occurs, and the magnetic poles 17 can be stably positioned. Accordingly, the rotor 1 can be rotated at a high speed with a high margin of safety, and the damage occurring in the alternator can be sufficiently prevented.

Still further, the centrifugal force and the magnetic attractive force applied to the magnetic poles 17 induce the poles 17 to be shifted or inclined to the outer side, this shifting or inclination of the poles 17 induces the second yoke portions 16 of the cores 10 to be bent toward the first axial side and induce the second yoke portions 16 of the cores 11 to be bent toward the second axial side. To prevent the deformation of the poles 17 and the portions 16, in each pair of two core layer units 2 adjacent to each other in the axial direction, each magnetic pole 17 of the core 11 in the unit 2 allocated on the first axial side is substantially placed at the same position in the circumferential direction as the position of one magnetic pole 17 of the core 10 in the other unit 2 allocated on the second axial side (see FIG. 2). In other words, the magnetic poles 17 of the core 11 in the unit 2 allocated on the first axial side face, in the axial direction, the respective magnetic poles 17 of the core 10 in the other unit 2 allocated on the second axial side. Therefore, each of the magnetic poles 17 facing each other in the axial direction prevents the bending of the other pole 17 against the centrifugal force and the magnetic attractive force. Because of this prevention, the shifting or inclination of the poles 17 to the outer side can be suppressed in the rotor 1, and the deformation of the portions 16 of the cores 10 and 11 can be suppressed. Accordingly, noise caused by the deformation of the portions 16 and the poles 17 can be reduced, and the durability of the cores 10 and 11 in the rotor 1 can be heightened.

Still further, the body 13 is located on the second axial side of the core 10 and on the inner side of the magnetic poles 17 of the core 10 as a first non-magnetic member so as to be in contact with the second yoke portion 16 of the core 10 while pressing the portion 16 from the second axial side, and the body 13 is located on the first axial side of the core 11 and on the inner side of the magnetic poles 17 of the core 11 as a second non-magnetic member so as to be in contact with the second yoke portion 16 of the core 11 while pressing the portion 16 from the first axial side (see FIG. 7A, FIG. 7B, FIG. 8A and FIG. 8B). Accordingly, without influencing the magnetic flux extending from one pole 17 in each pair of poles 17 of the cores 10 and 11, adjacent to each other in the circumferential direction, to the other pole 17 through the stator core, the body 13 can suppress the deformation of the portions 16 of the cores 10 and 11 so as to heighten the stiffness of the portions 16, and can further suppress the deformation of the poles 17 of the cores 10 and 11 so as to heighten the stiffness of the poles 17.

Assuming that a plurality of non-magnetic members separated from one another are located on the second axial side of the core 10 and on the inner side of the respective magnetic poles 17 of the core 10 in place of the body 13 so as to be in contact with the portion 16 of the core 10, there is high probability that the non-magnetic members are shifted toward the outer side due to the centrifugal force so as to press the poles 17 of the core 10 toward the outer side. Further, assuming that a plurality of non-magnetic members separated from one another are located on the first axial side of the core 11 and on the inner side of the respective magnetic poles 17 of the core 11 in place of the body 13 so as to be in contact with the portion 16 of the core 11, there is high probability that the non-magnetic members are shifted toward the outer side due to the centrifugal force so as to press the poles 17 of the core 11 toward the outer side. However, in this embodiment, because the body 13 not divided is located in each unit 2, there is no probability that the body 13 applies the pressing force to the poles 17.

Still further, because the body 13 is formed in a ring shape as one body, the deformation of the body 13 toward the outer side, induced by the centrifugal force, can be prevented. Therefore, the poles 17 of the cores 10 and 11 located on the outer side of the body 13 receive no load from the body 13. Accordingly, the body 13 can heighten the stiffness of the portions 16 and the poles 17 without applying any load to the poles 17.

Still further, the crossover lines 32 and the leading line 33a are placed on the inner side of the body 13. Therefore, the body 13 can prevent the crossover lines 32 and the leading line 33a from being shifted toward the outer side by the centrifugal force. Accordingly, the disconnection of the crossover line 32 or the leading line 33a can be prevented.

Still further, the crossover lines 32 and the leading line 33a are caught by the portions 30 of the hooks 27. Therefore, the crossover lines 32 and the leading line 33a can be reliably fixed to the bobbins 12. Accordingly, the disconnection of the crossover line 32 or the leading line 33a can be further prevented.

Second Embodiment

Figure 11:
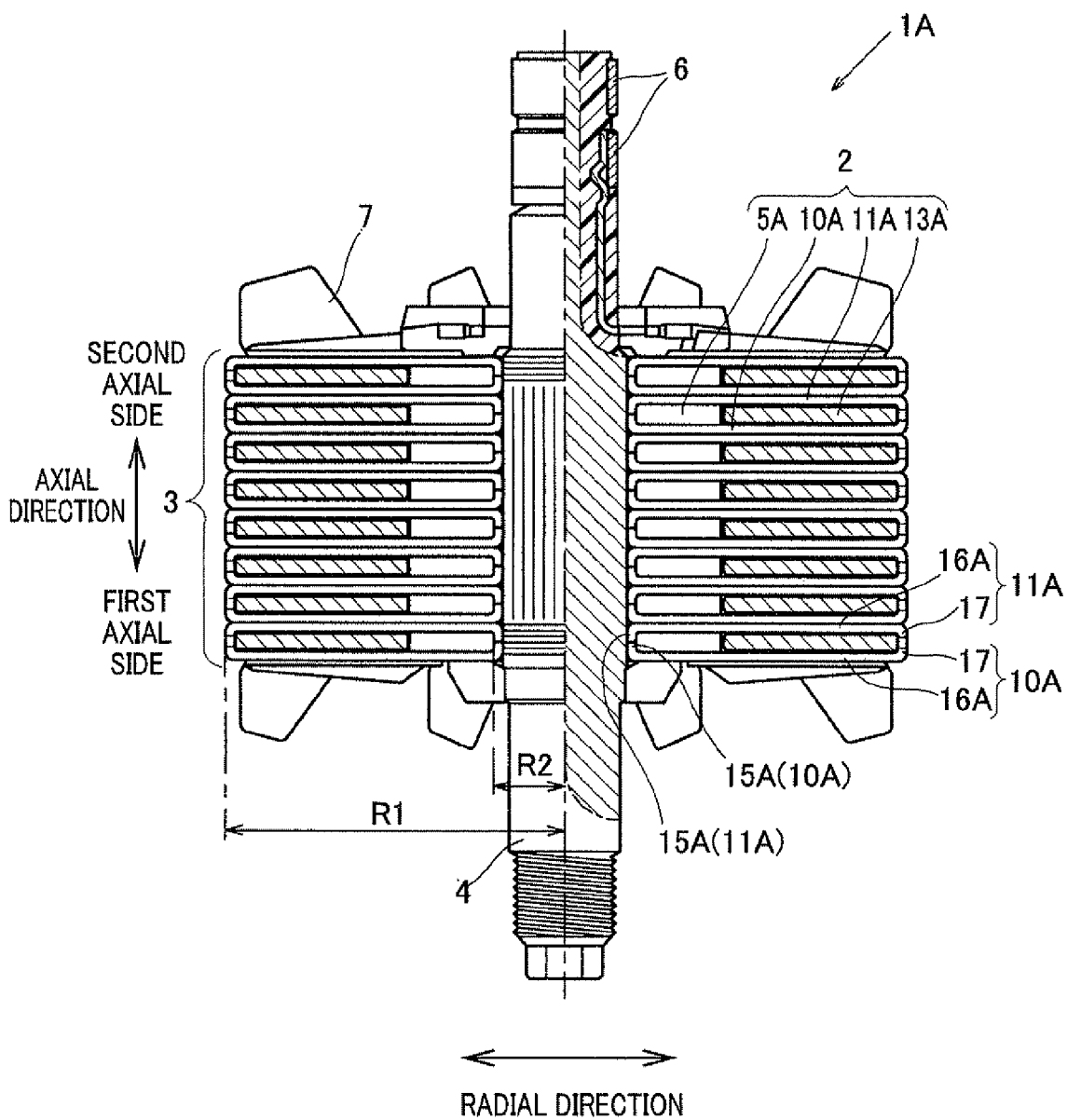
FIG. 11 is a side view, partially in cross section, of a rotor of an electric rotating machine according to the second embodiment of the present invention.

FIG. 11 is a side view, partially in cross section, of a rotor of an electric rotating machine according to the second embodiment. As shown in FIG. 11, a rotor 1A differs from the rotor 1 shown in FIG. 2 and FIG. 3 in that the rotor 1A has no spacer located between the laminated body 3 and the shaft 4. More specifically, each core layer unit 2 has a field coil 5A, a first rotor core 10A, a second rotor core 11A, a ring-shaped body 13A and a bobbin (not shown) assembled in the same manner as those in the unit 2 shown in FIG. 2 and FIG. 3. The coil 5A has an inner diameter and an outer diameter smaller than those in the coil 5 so as to approach the shaft 4. Each of the rotors 10A and 11A has a first yoke portion 15A having an outer diameter R2 smaller than that of the portion 15, a second yoke portion 16A extending from the portion 15A toward the outer side so as to substantially have the same outer diameter as that of the portion 16, and the magnetic poles 17 extending from the outer end of the portion 16A. The rotational diameter R1, the structure and the arrangement of the poles 17 shown in FIG. 11 are substantially the same as those of the poles 17 shown in FIG. 3. Although the outer diameter of the body 13A is substantially the same as the outer diameter of the body 13, the body 13A has an inner diameter larger than the inner diameter of the body 13 so as to be placed between the coil 5A and the poles 17.

With this structure of the rotor 1A, the coil 5A of each unit 2 is located near to the shaft 4 and has the number of turns which is substantially the same as the number of turns in the coil 5. Therefore, the weight of each coil 5A can be considerably reduced as compared with the weight of the coil 5, and the coil 5A can generate the magnetic flux at a desired density when a field current set at the same value as that supplied to the coil 5 is supplied to the coil 5A.

Further, although the length of the portions 16A of the cores 10A and 11A and the width of the body 13A in the radial direction are increased as compared with those in the rotor 1, the rotor 1A is lightened in weight because of the weight reduction in the coils 5A, the thinned portions 16A and the low specific gravity of the body 13A.

Accordingly, in the same manner as in the rotor 1, the generated electric power per unit weight in the rotor 1A can be increased as compared with the rotor in the prior art.

Third Embodiment

Figure 12:
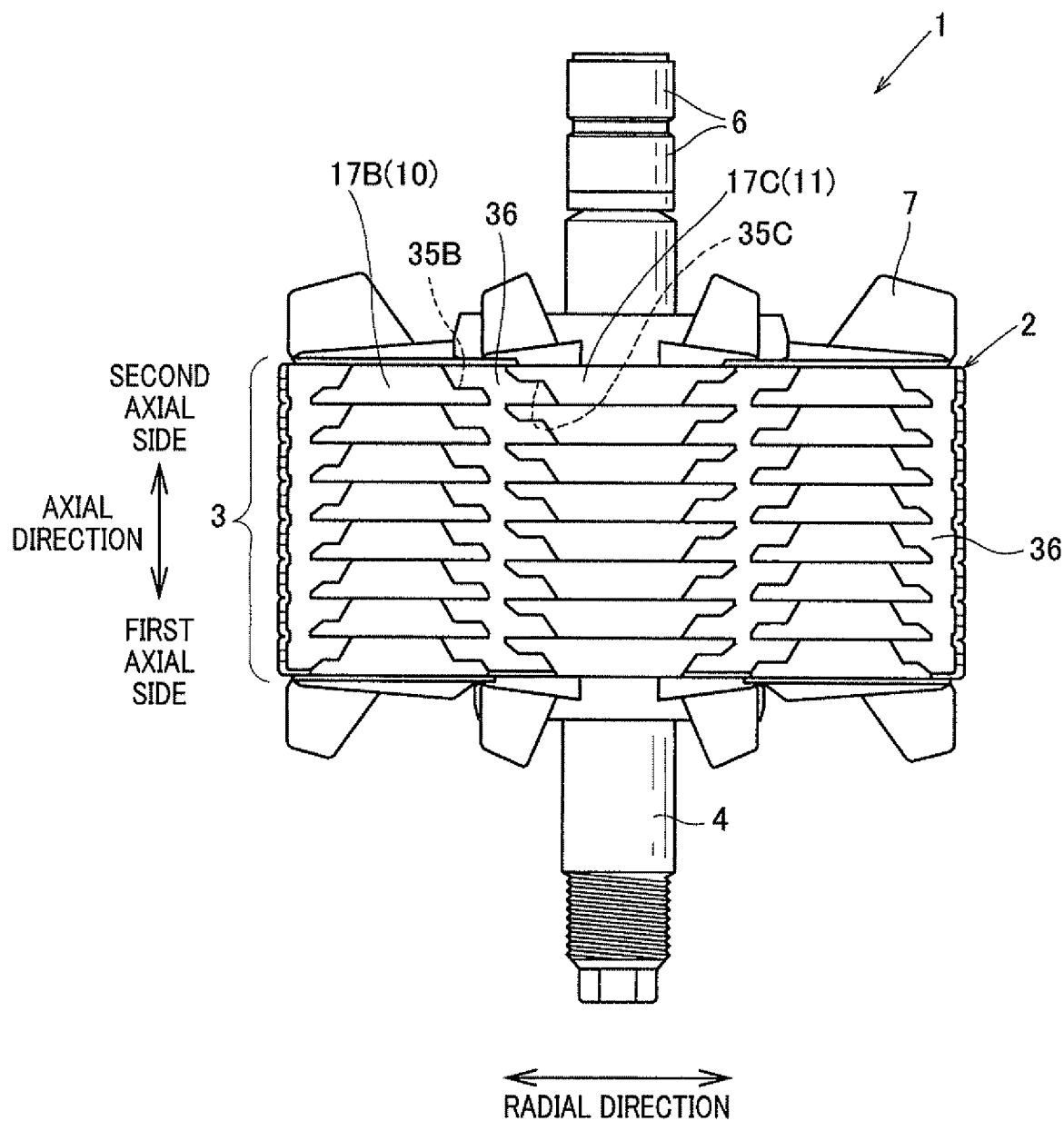
FIG. 12 is a side view of a rotor of an electric rotating machine according to the third embodiment of the present invention.
Figure 13:
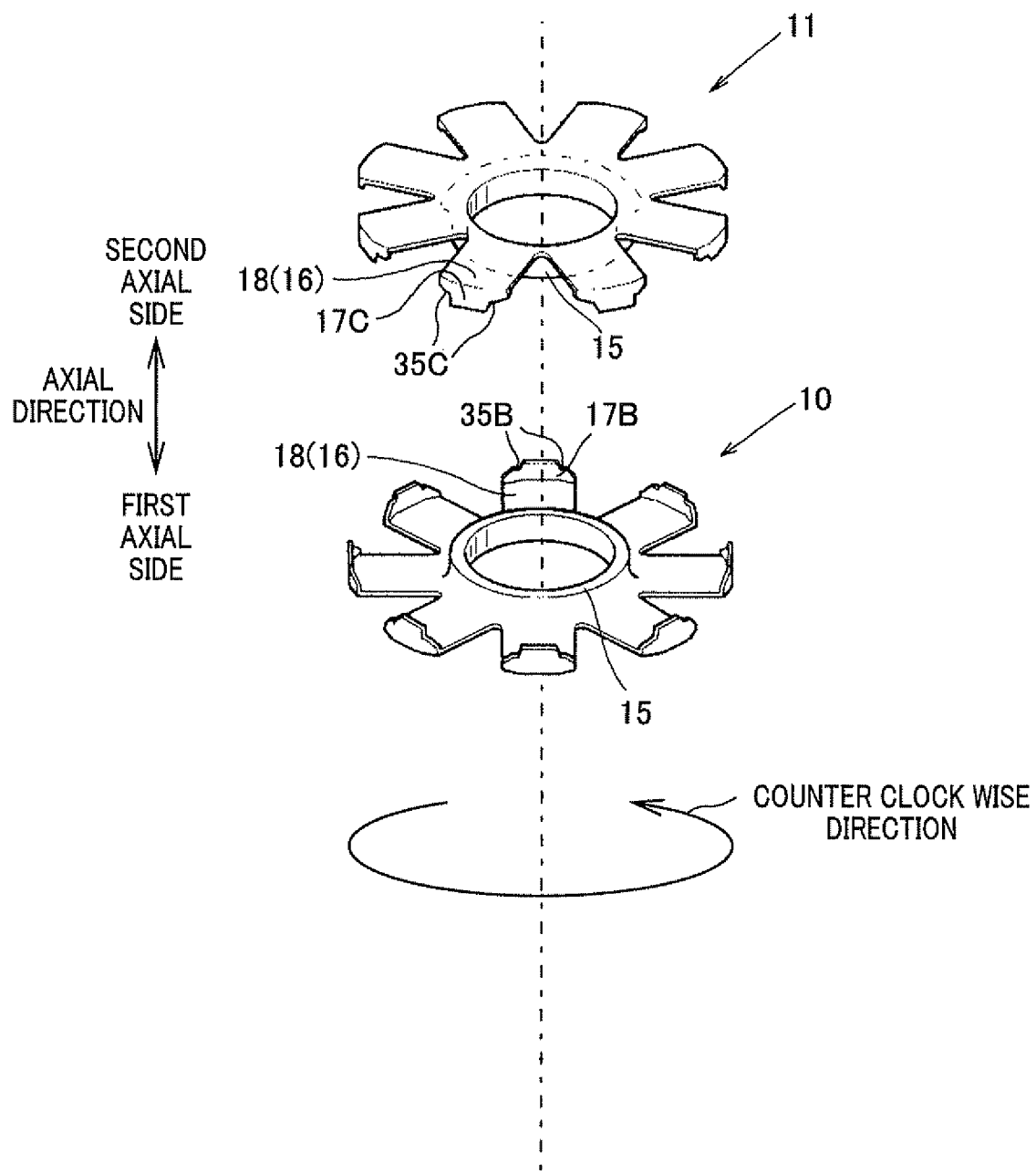
FIG. 13 is an exploded view of rotor cores of one core layer unit of the rotor shown in FIG. 12.

FIG. 12 is a side view of a rotor of an electric rotating machine according to the third embodiment, while FIG. 13 is an exploded view of rotor cores of one core layer unit of the rotor shown in FIG. 12. As shown in FIG. 12 and FIG. 13, a rotor 1B according to the third embodiment differs from the rotor 1 shown in FIG. 2 and FIG. 3 in that the width of each magnetic pole in the circumferential direction is narrowed step by step toward the top end of the pole.

More specifically, a plurality of claw-shaped magnetic poles 17B in the cores 10 differ from the poles 17 of the cores 10 shown in FIG. 4 and FIG. 5 in that each magnetic pole 17B has stepped ends on both sides in the circumferential direction to narrow the width toward the second axial side and to have at least one tread surface 35B, facing toward the second axial side, at each stepped end. A plurality of claw-shaped magnetic poles 17C in the cores 11 differ from the poles 17 of the cores 11 shown in FIG. 4 and FIG. 5 in that each magnetic pole 17C has stepped ends on both sides in the circumferential direction to narrow the width toward the first axial side and to have at least one tread surface 35C, facing toward the first axial side, at each stepped end. For example, each pole 17B has only one step at each stepped end so as to have one tread surface 35B at each stepped end, and each pole 17C has only one step at each stepped end so as to have one tread surface 35C at each stepped end.

The poles 17B of the core 10 and the poles 17C of the core 11 in each core layer unit 2 are alternately arranged along the circumferential directions. Each pole 17B of the core 10 in each unit 2 is substantially placed at the same position in the circumferential direction as the position of one pole 17B of the core 10 in any of the other units 2. Therefore, the poles 17B of the cores 10 of the units 2 are aligned along the axial direction at each of the positions in the circumferential direction to form a series of poles 17B at each position in the circumferential direction, and the poles 17C of the cores 11 of the units 2 are aligned along the axial direction at each of the other positions in the circumferential direction to form a series of poles 17C at each position in the circumferential direction.

The rotor 1B further has a reinforcing member 36 located between one series of poles 17B and one series of poles 17C, adjacent to each other as a pair in the circumferential direction so as to be in contact with the tread surfaces 35B and 35C of the poles 17B and 17C in the axial direction. The member 36 is shaped so as to substantially form no space between the series of poles 17B and the series of poles 17C. One reinforcing member 36 is located in the rotor 1B every two pairs. For example, in the counterclockwise direction when the rotor 1B is seen from the second axial side to the first axial side, the reinforcing member 36 is fitted to the series of poles 17B and the series of poles 17C, arranged in the order of the series of poles 17B and the series of poles 17C along the counterclockwise direction, but no reinforcing member is located between the series of poles 17B and the series of poles 17C, arranged in the order of the series of poles 17C and the series of poles 17B along the counterclockwise direction.

Because the members 36 are in contact with the tread surfaces 35B and 35C of all poles 17B and 17C in the axial direction, the members 36 can directly prevent the poles 17B and 170 of the rotor 1B from being shifted to the axial direction due to the centrifugal force and the magnetic attractive force exerted on the poles 17B and 17C. Because of this prevent ion, the deformation of the second yoke portions 16 of the cores 10 and 11 along the axial direction can be suppressed in the rotor 1B. Accordingly, noise caused by the deformation of the portions 16 and the poles 17B and 17C during the rotation of the rotor 1B can be reduced, and the durability of the cores 10 and 11 in the rotor 1B can be heightened.

In this embodiment, one reinforcing member 36 is located in the rotor 1B every two pairs. However, one reinforcing member 36 may be located in the rotor 1B every pair of one series of poles 17B and one series of poles 17C adjacent to each other along the circumferential direction.

Further, each reinforcing member 36 extends to all core layer units 2. However, one reinforcing member 36 may be located between one pole 17B and one pole 17C, adjacent to each other as a pair in each core layer unit 2 along the circumferential direction, for each pair of poles 17B and 17C or every two pairs of poles 17B and 17C.

Fourth Embodiment

Figure 14:
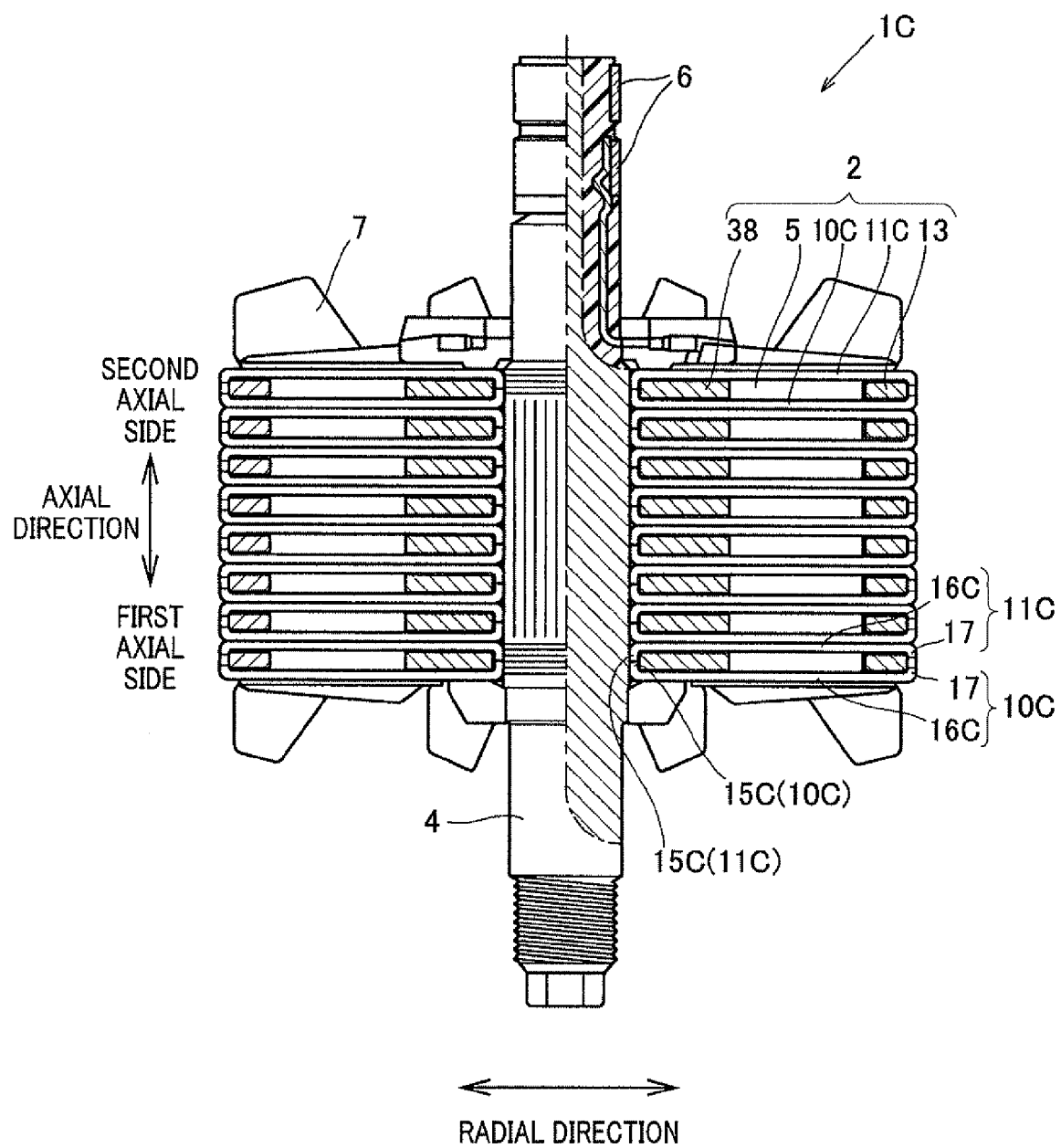
FIG. 14 is a side view, partially in cross section, of a rotor of an electric rotating machine according to the fourth embodiment of the present invention.

FIG. 14 is a side view, partially in cross section, of a rotor of an electric rotating machine according to the fourth embodiment. As shown in FIG. 14, a rotor 1C differs from the rotor 1 shown in FIG. 3 in that the rotor 1C has another ring-shaped body 38 made of magnetic material without locating any spacer between the shaft 4 and the laminated body 3. More specifically, each core layer unit 2 has the coil 5, a first rotor core 10C, a second rotor core 11C, the body 13 and the bobbin 12 (not shown) assembled in the same manner as those in the unit 2 shown in FIG. 3. Each of the rotors 10C and 11C has a first yoke portion 15C having an outer diameter R2 smaller than that of the portion 15 so as to be fitted to the shaft 4, a second yoke portion 16C extending from the portion 15C toward the outer side so as to substantially have the same outer diameter as that of the portion 16, and the magnetic poles 17 extending from the outer end of the portion 16C. The body 38 is located between the portions 16C of the cores 10C and 11C in the axial directions and is located between the coil 5 and the portions 15C of the cores 10C and 11C in the radial direction.

With this structure of the rotor 1C, a magnetic flux passes through the body 38 and the portions 15C of the cores 10C and 11C. Therefore, as compared with the sectional area of the magnetic flux in the portions 15 according to the first embodiment, the sectional area of the magnetic flux in the body 38 and the portions 15C is increased.

Therefore, the magnetic reluctance or resistance in a magnetic circuit made up in each core layer unit 2 can be reduced. Due to this reduction of the magnetic reluctance or resistance, the magnetic flux density can be increased so as to heighten electric power generated in the stator core surrounding the rotor 1C.

Further, the body 38 placed on the outer side of the portions 15C of the cores 10C and 11C prevents the cores 10C and 11C from being moved toward the outer side due to the centrifugal force and the magnetic attractive force exerted on the poles 17. Accordingly, the rotor 1C can be further stably rotated.

Fifth Embodiment

Figure 15A:
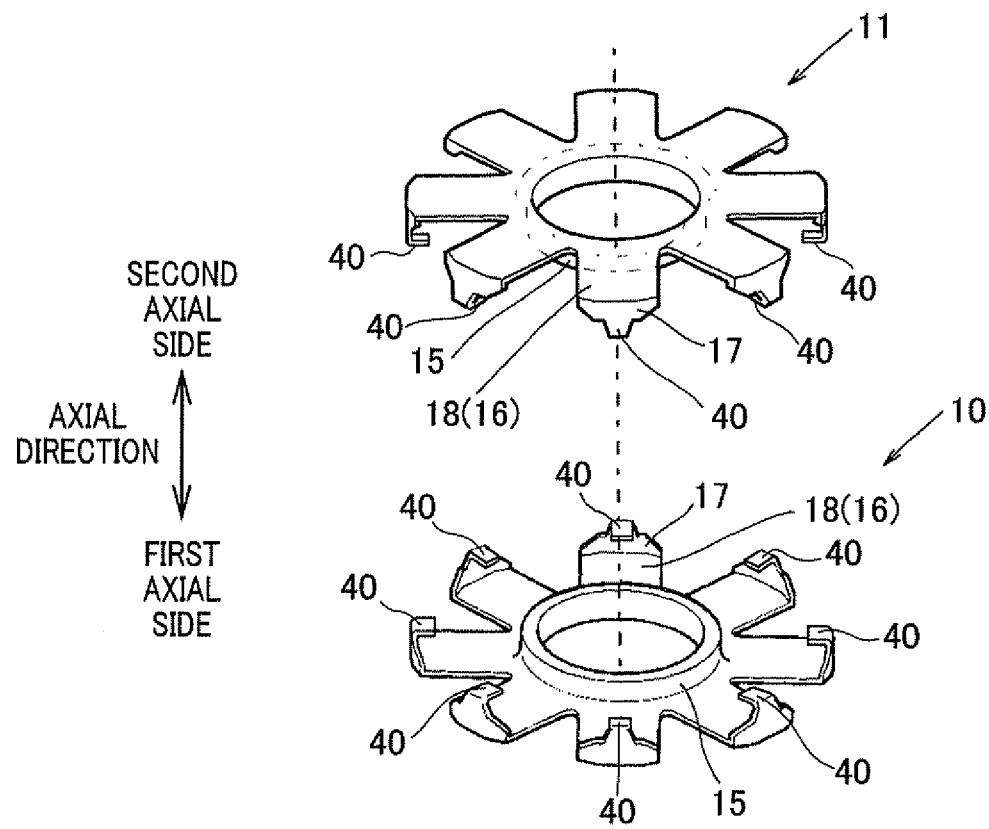
FIG. 15A is an exploded view of rotor cores of two core layer units adjacent to each other according to the fifth embodiment of the present invention.
Figure 15B:
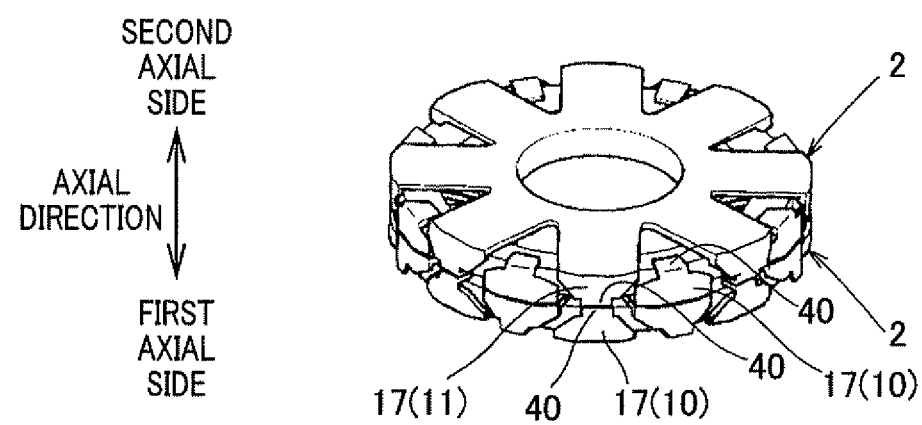
FIG. 15B is a perspective side view of two adjacent core layer units, in which magnetic poles magnetized in different polarities face each other, according to the fifth embodiment.

FIG. 15A is an exploded view of rotor cores of two core layer units adjacent to each other according to the fifth embodiment, while FIG. 15B is a perspective side view of two adjacent core layer units, in which two magnetic poles magnetized in different polarities face each other, according to the fifth embodiment. As shown in FIG. 15A, each magnetic pole 17 extending in the axial direction is bent toward the inner side to have a contacting portion 40 at the tip of the pole 17.

Further, as shown in FIG. 15B, in each pair of two core layer units adjacent to each other in the axial direction, each magnetic pole 17 of the core 10 of the unit 2 located on the first axial side is substantially placed at the same position in the circumferential direction as the position of one magnetic pole 17 of the core 11 of the unit 2 located on the second axial side. Therefore, the contacting portions 40 of the poles 17 of the core 10 in the unit 2 located on the first axial side are in contact with the respective contacting portions 40 of the poles 17 of the core 11 in the unit 2, located on the second axial side, in the axial direction. Further, due to the positioning of the poles 17 of the cores 10 and 11, the branches 18 of the second yoke portion 16 of the core 11 in the unit 2 located on the first axial side are in contact with the respective branches 18 of the second yoke portion 16 of the core 10 in the unit 2, located on the second axial side, in the axial direction.

In each unit 2, each contacting portion 40 of the core 10 is hooked on the body 13 from the second axial side, and each contacting portion 40 of the core 11 is hooked on the body 13 from the first axial side.

With this structure of the rotor 1C, the direction of lines of magnetic force induced in the poles 17 of the cores 10 is opposite to the direction of lines of magnetic force induced in the poles 17 of the cores 11. In this case, in response to the supply of a field current to the coils 5 of the units 2, the poles 17 of the cores 10 are magnetized in one polarity, and the poles 17 of the cores 11 are magnetized in another polarity different from the polarity of the poles 17 of the cores 10.

Further, in each pair of two core layer units 2 adjacent to each other in the axial direction, the contact portion 40 of each pole 17 of the core 10 in the unit 2 located on the first axial side is in contact with the contact portion 40 of one pole 17 of the core 11 in the unit 2, located on the second axial side, in the axial direction. These poles 17 having the contact portions 40 being in contact with each other in the axial direction are placed at the same position in the circumferential direction.

When the field current is supplied to the coils 5, two poles 17 in each pair of poles 17 of two cores 10 and 11 substantially placed at the same position in the circumferential direction in two units 2 adjacent to each other in the axial direction are magnetized in different polarities so as to tightly attach the contact portions 40 of the poles 17 to each other. Therefore, the portions 40 of the poles 17 attached to each other directly prevent the poles 17 from being deformed along the axial direction due to the centrifugal force and the magnetic attractive force exerted on the poles 17. Further, the portions 40 of the poles 17 prevent the second yoke portions 16 of the poles 17 from being deformed along the axial direction.

Accordingly, noise caused by the deformation of the portions 16 and the poles 17 during the rotation of the rotor 1 can be reduced, and the durability of the cores 10 and 11 in the rotor 1 can be heightened.

Modifications

In these embodiments, the crossover lines 32 and the leading line 33a are caught by the bending portions 30 of the hooks 27. However, at least one crossover line 32 or the leading line 33a may be caught by the portion 29 of the hook 27 or the like.

Further, in the fifth embodiment, each of the poles 17 of the cores 10 and 11 has one contact portion 40. However, each pole 17 of the cores 10 may have one contact portion 40 while none of the poles 17 of the cores 11 has a contact portion, or each pole 17 of the cores 11 may have one contact portion 40 while none of the poles 17 of the cores 10 has a contact portion. Because two poles 17 of the cores 10 and 11 facing each other in two units 2 adjacent to each other in the axial direction are magnetized in different polarities, the poles 17 of the cores 10 and 11 can be magnetically attached to each other even when one of the poles 17 has no contact portion.

In these embodiments, the electric rotating machine having the rotor 1, 1A or 1C, for example, represents an alternating current (AC) motor such as an induction motor, an AC generator such as an induction generator, a direct current (DC) motor, and a DC generator.

What is claimed is:

1. A rotor of an electric rotating machine, comprising:
a laminated body, having a plurality of core layer units serially located along an axial direction so as to place an outer magnetic body on an outer side of the core layer units in a radial direction, that is rotatable about a center axis extending along the axial direction,
each of the core layer units comprising:
a field coil, wound in a cylindrical shape around the center axis of the laminated body, that generates a magnetic flux;
a first rotor core, located on a first axial side of the field coil in the axial direction, that receives the magnetic flux;
a second rotor core, located on a second axial side of the field coil in the axial direction, that receives the magnetic flux;
a first non-magnetic body that is located on the second axial side of the first rotor core; and
a second non-magnetic body that is located on the first axial side of the second rotor core,
each of the first and second rotor cores comprising:
a first yoke portion formed in a cylindrical shape so as to be located on an inner side of the field coil, the first yoke portion having an outer circumferential diameter equal to a distance from the central axis of the laminated body to an outer circumferential surface of the first yoke portion in the radial direction;
a second yoke portion extending from the first yoke portion toward the outer side of the field coil; and
a plurality of claw-shaped magnetic poles located on the outermost side of the second yoke portion, the magnetic poles having a rotational diameter equal to a distance from the central axis of the laminated body to the magnetic poles in the radial direction such that a ratio of the outer circumferential diameter of the first yoke portion to the rotational diameter of the magnetic poles is lower than 0.54,
wherein the magnetic flux directly extends from the first yoke portion of one of the first and second rotor cores to the first yoke portion of the other of the first and second rotor cores,
the magnetic poles of the first rotor core and the magnetic poles of the second rotor core are alternately arranged in a circumferential direction on the outer side of the field coil, the magnetic flux indirectly extending from one magnetic pole in each pair of magnetic poles of the first and second rotor cores, the pair of magnetic poles being adjacent to each other in the circumferential direction, to the other magnetic pole through the outer magnetic body located on the outer side of the magnetic poles,
the first non-magnetic body is in contact with the second yoke portion of the first rotor core on the inner side of the magnetic poles of the first rotor core, and
the second non-magnetic body is in contact with the second yoke portion of the second rotor core on the inner side of the magnetic poles of the second rotor core.

2. The rotor according to claim 1, wherein, in each pair of two core layer units adjacent to each other in the axial direction, each magnetic pole of the second rotor core in the core layer unit located on the first axial side is substantially located at the same position in the circumferential direction as one magnetic pole of the first rotor core in the other core layer unit located on the second axial side.

3. The rotor according to claim 1, wherein the first and second non-magnetic bodies constitute a single ring-shaped body.

4. The rotor according to claim 3, further comprising:

a rotational shaft extending along the center axis of the laminated body so as to be rotated with the laminated body; and a slip ring, located on the rotational shaft, through which a field current is supplied to the field coils of the laminated body, wherein, in each pair of two core layer units adjacent to each other in the axial direction, a crossover line electrically connects the field coil of one core layer unit of the pair located on the first axial side and the field coil of the other core layer unit of the pair located on the second axial side, a leading line electrically connects the field coils of the core layer units located on each end of the laminated body in the axial direction and the slip ring, and the crossover and leading lines are located on the inner side of the ring-shaped body.

5. The rotor according to claim 1, further comprising:

a rotational shaft extending along the center axis of the laminated body so as to be rotated with the laminated body;

a slip ring, located on the rotational shaft, through which a field current is supplied to the field coils of the laminated body; and a first plate-shaped insulating member, located on the first axial side of the field coil in each core layer unit, that electrically insulates the field coil from the first rotor core of the core layer unit and has a hook at an outer end in the radial direction, a second plate-shaped insulating member, located on the second axial side of the field coil in each core layer unit, that electrically insulates the field coil from the second rotor core of the core layer unit and has a hook at an outer end in the radial direction, wherein, in each pair of two core layer units adjacent to each other in the axial direction, a crossover line electrically connects the field coil of one core layer unit of the pair located on the first axial side and the field coil of the other core layer unit of the pair located on the second axial side, a leading line electrically connects the field coils of the core layer units located on each end of the laminated body in the axial direction and the slip ring, and the crossover and leading lines are caught by the hooks of the first and second insulating members from the outer side in the radial direction to be fixed to the insulating members.

6. The rotor according to claim 1, wherein the second yoke portion is substantially flat and extends from the first yoke portion along a radial plane orthogonal to the axial direction.

7. The rotor according to claim 1, wherein the claw-shaped magnetic poles extend from the second yoke portion a projection distance, and the projection distance is equal to a thickness of the first and second non-magnetic bodies in the axial direction.

* * * * *